US012451606B2

(12) United States Patent
Nozaki et al.

(10) Patent No.: US 12,451,606 B2
(45) Date of Patent: Oct. 21, 2025

(54) PATCH ANTENNA

(71) Applicant: YOKOWO CO., LTD., Tokyo (JP)

(72) Inventors: Takashi Nozaki, Tomioka (JP); Hirotoshi Mizuno, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 131 days.

(21) Appl. No.: 18/268,605

(22) PCT Filed: Dec. 20, 2021

(86) PCT No.: PCT/JP2021/047073

§ 371 (c)(1),
(2) Date: Jun. 21, 2023

(87) PCT Pub. No.: WO2022/138582

PCT Pub. Date: Jun. 30, 2022

(65) Prior Publication Data

US 2024/0047879 A1 Feb. 8, 2024

(30) Foreign Application Priority Data

Dec. 23, 2020 (JP) ................................ 2020-213444

(51) Int. Cl.
*H01Q 9/04* (2006.01)
*H01Q 1/32* (2006.01)
*H01Q 19/22* (2006.01)

(52) U.S. Cl.
CPC ......... *H01Q 9/0435* (2013.01); *H01Q 1/3275* (2013.01); *H01Q 19/22* (2013.01)

(58) Field of Classification Search
CPC ...... H01Q 1/32; H01Q 1/3275; H01Q 9/0407; H01Q 9/0428; H01Q 9/0435; H01Q 19/22
See application file for complete search history.

(56) References Cited

U.S. PATENT DOCUMENTS 5,886,669 A 3/1999 Kita
9,419,338 B2 8/2016 Chiu
2005/0280592 A1 12/2005 Yegin et al.
(Continued)

FOREIGN PATENT DOCUMENTS

JP H09-036651 A 2/1997
JP 2006-261941 A 9/2006
(Continued)

OTHER PUBLICATIONS

Office Action issued on Dec. 10, 2024, in corresponding Japanese patent Application No. 2020-213444, 2 pages.
(Continued)

*Primary Examiner* — Daniel Munoz
(74) *Attorney, Agent, or Firm* — XSENSUS LLP

(57) ABSTRACT

A patch antenna includes: a dielectric member; a radiating element provided at the dielectric member; and at least one parasitic element provided in a surrounding region of the dielectric member and the radiating element, the at least one parasitic element being grounded. Further, the at least one parasitic element includes a plurality of parasitic elements, the plurality of parasitic elements are provided in the surrounding region of the radiating element, and the plurality of parasitic elements are each provided at a position away from an outer edge of the radiating element by a predetermined distance.

14 Claims, 38 Drawing Sheets

(56) References Cited

U.S. PATENT DOCUMENTS

| | | | | |
|---|---|---|---|---|
| 2012/0019425 | A1 | 1/2012 | Lee et al. | |
| 2017/0047665 | A1 | 2/2017 | Yang et al. | |
| 2020/0365979 | A1 | 11/2020 | Rodriguez et al. | |
| 2021/0126366 | A1* | 4/2021 | Sudo ........................ | H01Q 5/28 |

FOREIGN PATENT DOCUMENTS

| | | | |
|---|---|---|---|
| JP | 2008-219574 | A | 9/2008 |
| JP | 2008-252857 | A | 10/2008 |
| JP | 2014-160902 | A | 9/2014 |
| WO | 2018/111690 | A1 | 6/2018 |

OTHER PUBLICATIONS

International Search Report and Written Opinion mailed on Mar. 15, 2022, received for PCT Application PCT/JP2021/047073, filed on Dec. 20, 2021, 9 pages including English Translation.
Office Action issued on Oct. 1, 2024, in corresponding Japanese patent Application No. 2020-213444, 2 pages.
Extended European search report issued on May 21, 2024, in corresponding European patent Application No. 21910725.7, 9 pages.

* cited by examiner

COMPARATIVE EXAMPLE

COMPARATIVE EXAMPLE

CALCULATION RESULTS OF PATCH ANTENNA 30H

CALCULATION RESULTS OF PATCH ANTENNA 30H

CALCULATION RESULTS OF PATCH ANTENNA 30I

CALCULATION RESULTS OF PATCH ANTENNA 30I

PATCH ANTENNA

CROSS-REFERENCE TO RELATED APPLICATIONS

The present application is based on PCT filing PCT/JP2021/047073, filed Dec. 20, 2021, which claims priority to Japanese Patent Application No. 2020-213444, filed Dec. 23, 2020, the entire disclosure of each is incorporated herein.

TECHNICAL FIELD

The present disclosure relates to a patch antenna.

BACKGROUND ART

PTL 1 discloses a patch antenna including a ground conductor plate, a dielectric substrate, and a radiating element.

CITATION LIST

Patent Literature

[PTL 1] Japanese Patent Application Publication No. 2014-160902

SUMMARY OF INVENTION

Technical Problem

When an antenna device that houses a patch antenna is reduced in size, the area of a base to which the patch antenna is grounded is reduced, which may decrease the gain of the patch antenna at low elevation angles.

An example object of the present disclosure is to improve the gain of a patch antenna at low elevation angles. Other objects of the present disclosure will become apparent from the descriptions provided herein.

Solution to Problem

An aspect of the present disclosure is a patch antenna comprising: a dielectric member; a radiating element provided at the dielectric member; and at least one parasitic element provided in a surrounding region of the dielectric member and the radiating element, the at least one parasitic element being grounded.

According to an aspect of the present disclosure, the gain of a patch antenna at low elevation angles is improved.

DESCRIPTION OF EMBODIMENTS

At least following matters will become apparent from the descriptions of the present specification and the accompanying drawings.

<<<Mounting Position of the In-Vehicle Antenna Device 10 in Vehicle 1>>>

Figure 1:
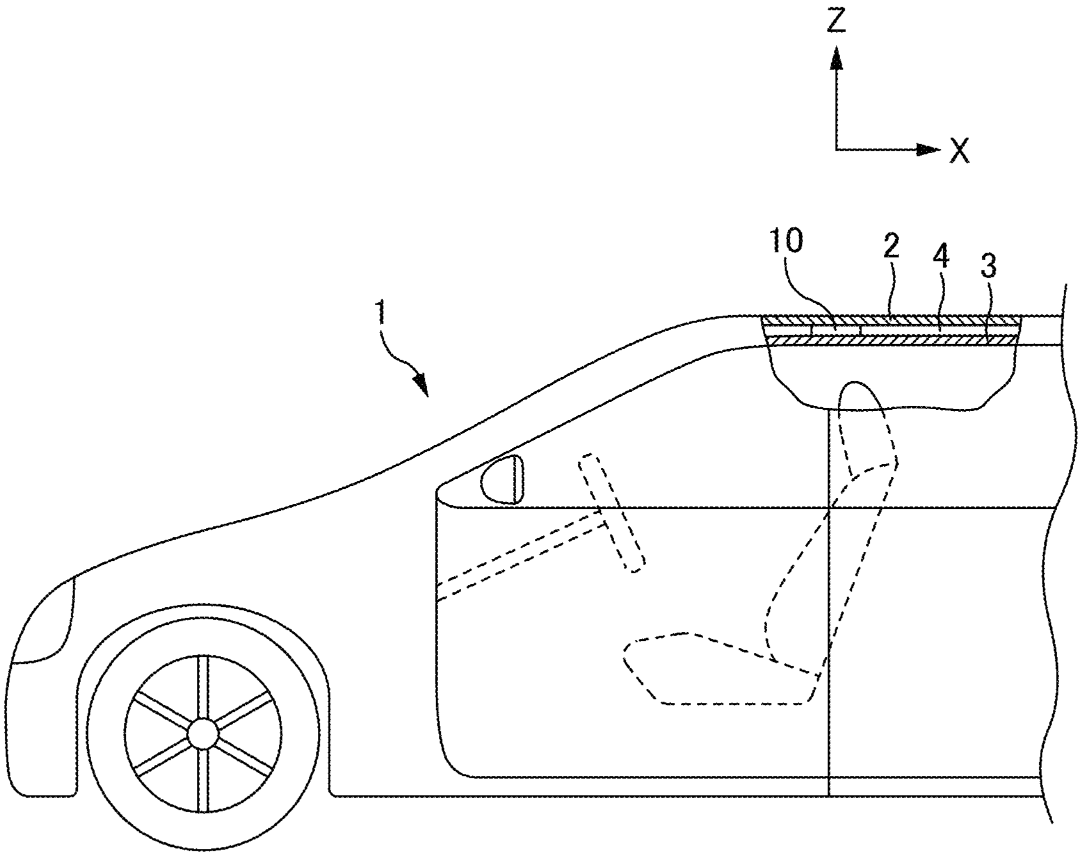
FIG. 1 is a side view of a vehicle 1.

FIG. 1 is a side view of a front part of a vehicle 1 to which an in-vehicle antenna device 10 is mounted. Hereinafter, a front-rear direction of the vehicle to which the in-vehicle antenna device 10 is to be mounted is defined as an X-direction, a left-right direction perpendicular to the X-direction is defined as a Y-direction, and a vertical direction perpendicular to the X-direction and the Y-direction is defined as a Z-direction. Further, as seen from a driver's seat of the vehicle, a direction to the front side is defined as a +X-direction, a direction to the right side is defined as a +Y-direction, and the zenith direction (upward direction) is defined as a +Z-direction. Hereinafter, in an embodiment of the present disclosure, a description will be given assuming that the front and rear, left and right, and up and down directions of the in-vehicle antenna device 10 are the same as the front and rear, left and right, and up and down directions of the vehicle, respectively.

The in-vehicle antenna device 10 is housed in a cavity 4 between a roof panel 2 of the vehicle 1 and a roof lining 3 on the ceiling surface of the vehicle interior. The roof panel 2 is formed of, for example, an insulating resin so that the in-vehicle antenna device 10 can receive electromagnetic waves (hereinafter also referred to as "radio waves" as appropriate).

The in-vehicle antenna device 10 housed in the cavity 4 is fixed, for example, with screws, to the roof lining 3 made of an insulating resin. In this way, the in-vehicle antenna device 10 is surrounded by the roof panel 2 and the roof lining 3 that are insulating. Note that the in-vehicle antenna device is fixed to the roof lining 3 in an embodiment of the present disclosure, however, the in-vehicle antenna device 10 may be fixed, for example, to a vehicle frame or the roof panel 2 made of a resin.

Further, because the actual cavity 4 has limited space, it is difficult to increase the area of the ground plate, which functions as a ground for the in-vehicle antenna device 10. Thus, when a typical patch antenna is provided in an in-vehicle antenna device, gain at low elevation angles may be lowered. Hereinafter, in an embodiment of the present disclosure, a description will be given of the in-vehicle antenna device 10 including a patch antenna capable of improving gain at low elevation angles.

<<<Overview of the In-Vehicle Antenna Device 10>>>

Figure 2:
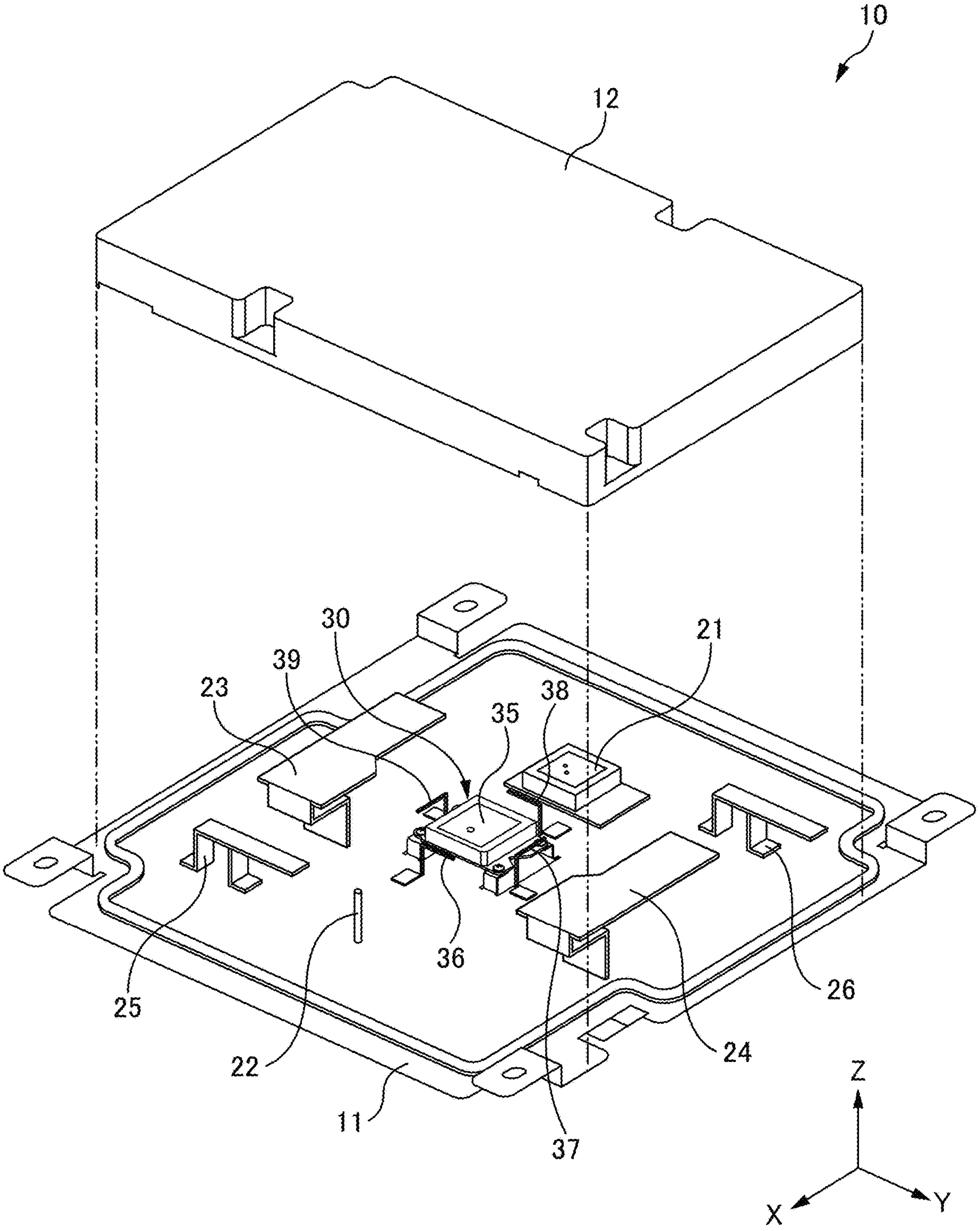
FIG. 2 is an exploded perspective view of an in-vehicle antenna device 10.

FIG. 2 is an exploded perspective view of the in-vehicle antenna device 10. The in-vehicle antenna device 10 is an antenna device including a plurality of antennas that operate in different frequency bands, and includes a base 11, a case 12, antennas 21 to 26, and a patch antenna 30.

The base 11 is a quadrilateral metal plate used as a shared ground for the antennas 21 to 26 and the patch antenna 30, and is provided onto the roof lining 3, in the cavity 4. Further, the base 11 is a thin plate extending to the front and rear and to the left and right.

The case 12 is a box-shaped member with the lower one of six surfaces thereof being open. Because the case 12 is formed of an insulating resin, radio waves can pass through the case 12. The case 12 is attached to the base 11 such that the opening of the case 12 is closed with the base 11. Thus, the antennas 21 to 26 and the patch antenna 30 are housed in the space inside the case 12.

The antennas 21 to 26 and the patch antenna 30 are mounted on the base 11, inside the case 12. The patch antenna 30 is disposed near the center of the base 11, and the antennas 21 to 26 are disposed in the surrounding region of the patch antenna 30. Specifically, the antennas 21, 22 are disposed on the front side and the rear side of the patch antenna 30, respectively. Further, the antennas 23, 24 are disposed on the left side and the right side of the patch antenna 30, respectively. Furthermore, the antenna 25 is disposed on the left side of the antenna 22 and the rear side of the antenna 23, and the antenna 26 is disposed on the right side of the antenna 21 and the front side of the antenna 24.

The antenna 21 is, for example, a planar antenna used for GNSS (Global Navigation Satellite System) to receive radio waves in the 1.5 GHz band from an artificial satellite.

The antenna 22 is, for example, a monopole antenna used for a V2X (Vehicle-to-everything) system to transmit and receive radio waves in the 5.8 GHz band or the 5.9 GHz band. Note that although it is assumed here that the antenna 22 is an antenna for V2X, the antenna 22 may be, for example, an antenna for Wi-Fi or Bluetooth.

The antennas 23, 24 are, for example, antennas used for LTE (Long Term Evolution) and the fifth-generation mobile communication system. The antennas 23, 24 transmit and receive radio waves from the 700 MHz frequency band to the 2.7 GHz band defined by the LTE standards. Further, the antennas 23, 24 also transmit and receive radio waves in Sub-6 bands defined by the standards of the fifth-generation mobile communication system, in other words, frequency bands from the 3.6 GHz band to less than 6 GHz. The antennas 23, 24 may also be telematics antennas.

The antennas 25, 26 are, for example, antennas used for the fifth-generation mobile communication system. The antennas 25, 26 transmit and receive radio waves in the Sub-6 bands defined by the standards of the fifth-generation mobile communication system. The antennas 25, 26 may be telematics antennas.

Note that the communication standards and frequency bands that are applicable to the antennas 21 to 26 are not limited to the above, and other communication standards and frequency bands may be used instead.

The patch antenna 30 is, for example, an antenna used for the SDARS (Satellite Digital Audio Radio Service) system. The patch antenna 30 receives left circularly polarized waves in the 2.3 GHz band.

<<<Details of Patch Antenna 30>>>

Figure 3:
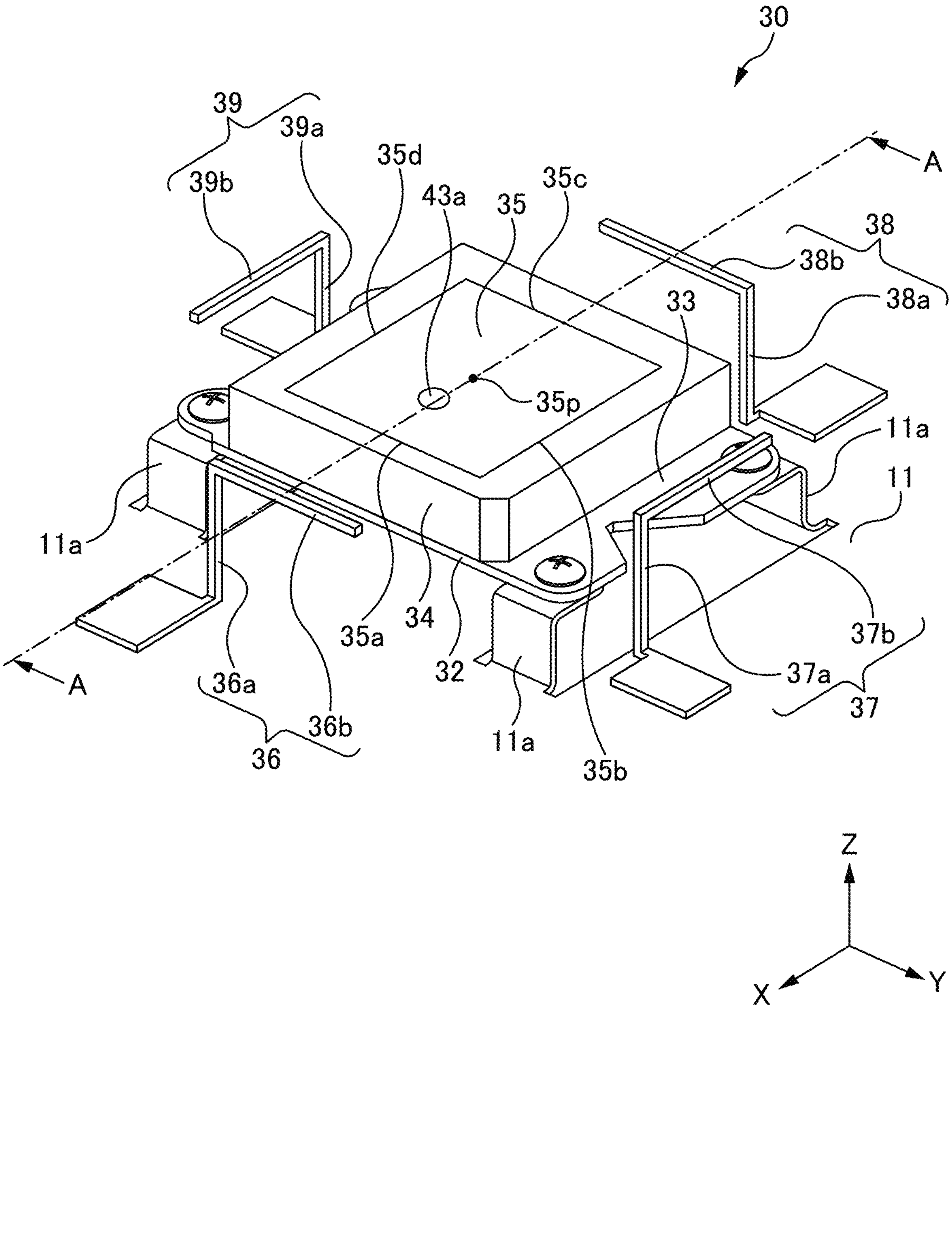
FIG. 3 is a perspective view of a patch antenna 30.
Figure 4:
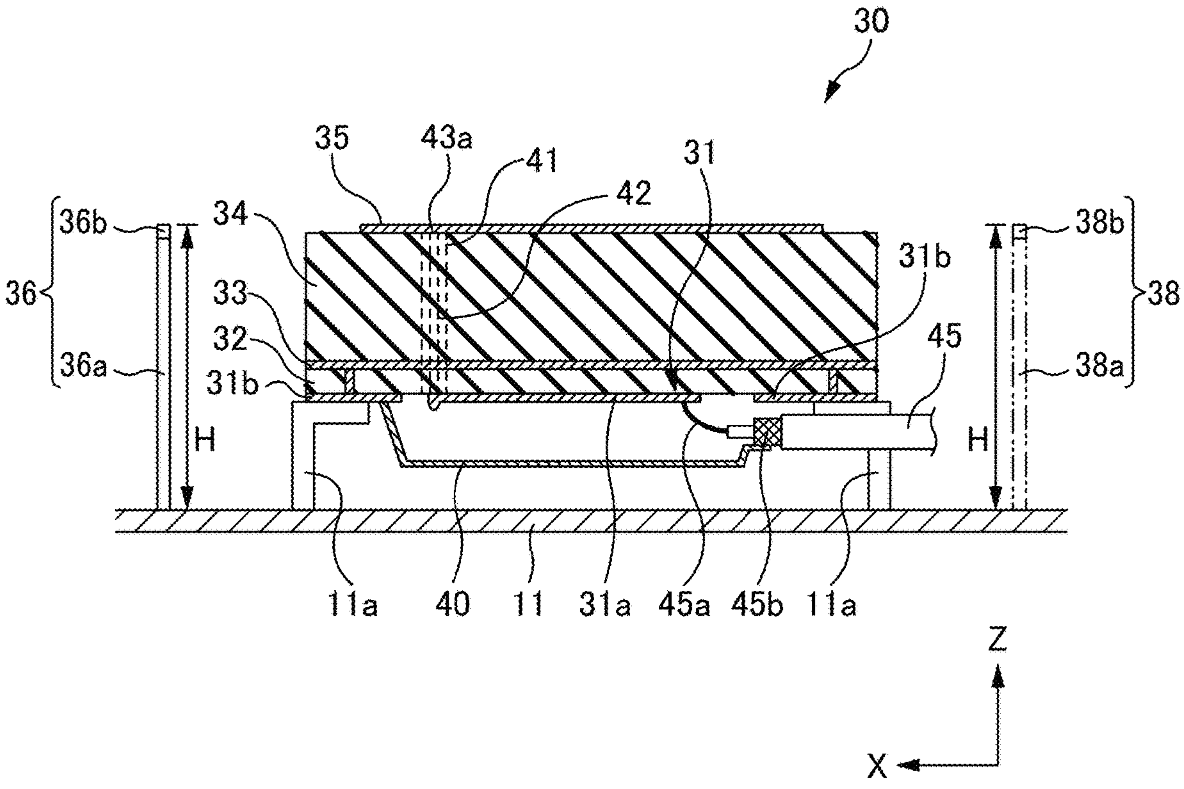
FIG. 4 is a cross-sectional view of a patch antenna 30.
Figure 5:
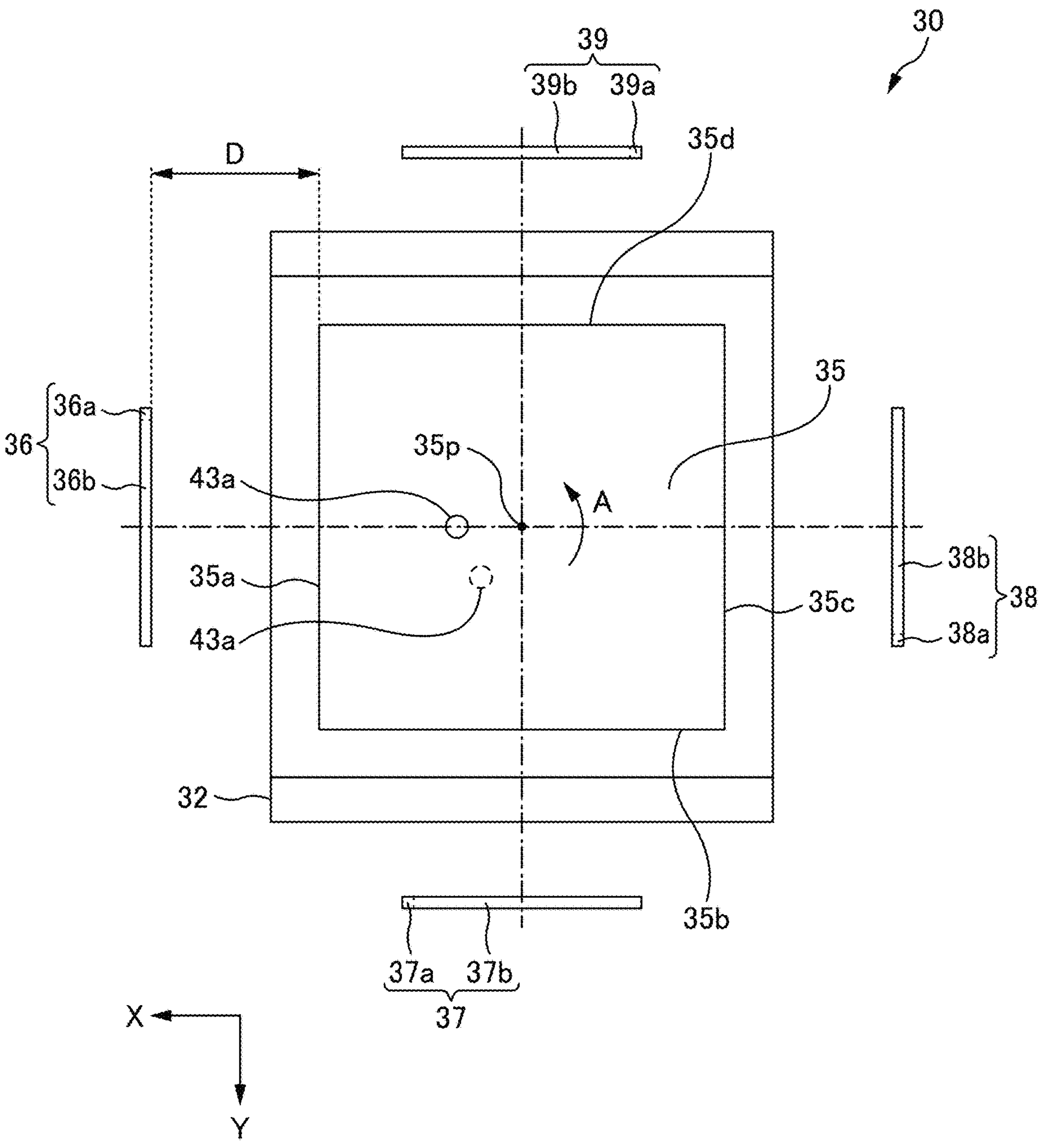
FIG. 5 is a plan view of a patch antenna 30 of a single-feed system.
Figure 6:
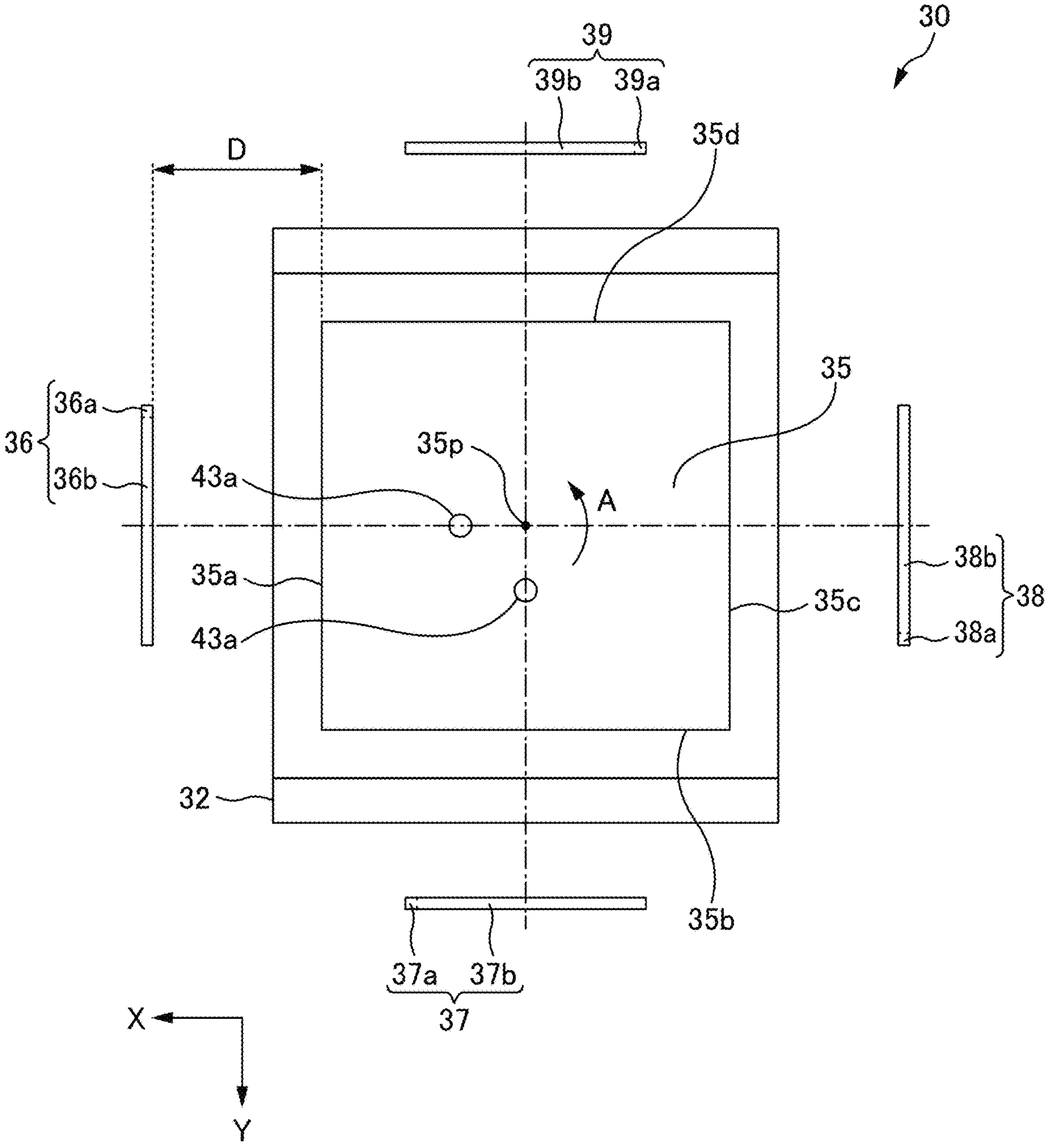
FIG. 6 is a plan view of a patch antenna 30 of a double-feed system.

The following describes the patch antenna 30 in detail, with reference to FIGS. 3 to 6. FIG. 3 is a perspective view of the patch antenna 30, FIG. 4 is a cross-sectional view of the patch antenna 30 taken along a line A-A of FIG. 3, and FIGS. 5 and 6 are plan views of the patch antenna 30.

The patch antenna 30 includes a circuit board 32 having conductive patterns 31, 33 (described later) formed therein, a dielectric member 34, a radiating element 35, parasitic elements 36 to 39, and a shield cover 40. Note that, in an embodiment of the present disclosure, the circuit board 32, the dielectric member 34, and the radiating element 35 laminated in this order in the positive Z-axis direction are hereinafter referred to as "main body part of the patch antenna 30." Further, the four parasitic elements 36 to 39 are disposed around the main body part of the patch antenna 30.

The circuit board 32 is a dielectric plate member having the conductive patterns 31, 33 formed in its back surface (the surface in the negative Z-axis direction) and its front surface (the surface in the positive Z-axis direction), respectively, and is made of, for example, a glass epoxy resin. The pattern 31 includes a circuit pattern 31*a* and a ground pattern 31*b*.

The circuit pattern 31*a* is, for example, a conductive pattern to which a signal line 45*a* of a coaxial cable 45 from an amplifier board (not illustrated) is coupled. Further, a braid 45*b* of the coaxial cable 45 is electrically coupled to the ground pattern 31*b* by soldering (not illustrated). Note that a configuration for connecting the circuit pattern 31*a* and the radiating element 35 to each other will be described later.

The ground pattern 31*b* is a conductive pattern to ground the main body part of the patch antenna 30. The ground pattern 31*b* and four seat portions 11*a* provided at the metal base 11 are electrically coupled to each other. Here, each of the four seat portions 11*a* is formed by bending a part of the base 11 such that the main body part of the patch antenna 30 can be supported. Then, with the ground pattern 31*b* and the seat portions 11*a* being electrically coupled, the ground pattern 31*b* is grounded. Note that, for example, the metallic shield cover 40 is attached to the back surface of the circuit board 32 in order to protect the circuit pattern 31*a*. Further, the shield cover 40 shields electric circuit components, such as an amplifier and the like, mounted to the back surface of the circuit board 32.

The pattern 33 formed in the front surface of the circuit board 32 is a ground pattern to function as a ground for a circuit (not illustrated) and a ground conductor plate (or a ground conductor film) of the patch antenna 30. The pattern 33 is electrically coupled to the ground pattern 31*b* through a through-hole. Further, the ground pattern 31*b* is electrically coupled to the base 11 through the seat portions 11*a* and fixing screws for fixing the circuit board 32 to the seat portions 11*a*. Thus, the pattern 33 is electrically coupled to the base 11.

The dielectric member 34 is a substantially quadrilateral plate-shaped member having sides parallel to the X-axis and sides parallel to the Y-axis. The front surface and the back surface of the dielectric member 34 are parallel to the X-axis and the Y-axis, and the front surface of the dielectric member 34 is oriented toward the positive Z-axis direction and the back surface of the dielectric member 34 is oriented toward the negative Z-axis direction. The back surface of the dielectric member 34 is attached to the pattern 33 with, for example, a double-sided tape. Note that the dielectric member 34 is formed of a dielectric material such as ceramics or the like.

The radiating element 35 is a substantially quadrilateral conductive element having a smaller area than the front surface of the dielectric member 34, and is formed in the front surface of the dielectric member 34. Note that, in an embodiment of the present disclosure, the direction of a normal line to the radiation surface of the radiating element is the positive Z-axis direction. Further, the radiating element 35 has sides 35*a*, 35*c* parallel to the Y-axis and sides 35*b*, 35*d* parallel to the X-axis.

Here, the term "substantially quadrilateral" refers to a shape formed by four sides, including, for example, a square and a rectangle, and for example, at least one of corners thereof may be cut away obliquely with respect to the sides. Further, in the "substantially quadrilateral" shape, a notch (recess) or a projection (protrusion) may be provided to part of the sides. In other words, the "substantially quadrilateral" shape only has to be such a shape for the radiating element 35 to be able to transmit and receive radio waves in a desired frequency band.

A through-hole 41 penetrates through the circuit board 32, the pattern 33, and the dielectric member 34. A feed line 42 is provided inside the through-hole 41, to couple the circuit pattern 31*a* and the radiating element 35 to each other. Note that the feed line 42 couples the circuit pattern 31*a* and the radiating element 35 to each other while electrically insulating them from the grounded pattern 33. Further, in an embodiment of the present disclosure, the point at which the feed line 42 is electrically coupled to the radiating element is referred to as feed point 43*a*.

FIG. 5 is a diagram illustrating the position of the feed point 43*a* in the radiating element 35 of a single-feed system. In an embodiment of the present disclosure, as given by a solid line in FIG. 5, the feed point 43*a* is provided at a position offset from a center point 35*p* of the radiating element 35 in the positive X-axis direction. However, the position of the feed point 43*a* is not limited to this, and for example, the feed point 43*a* may be provided at a position offset from the center point 35*p* of the radiating element 35 in the positive X-axis direction and in the negative Y-axis direction, as given by a dashed-dotted line in FIG. 5.

Note that the "center point 35*p* of the radiating element 35" refers to the center point, in other words, the geometric center, of the shape of the outer edge of the radiating element 35. The radiating element 35 of a single-feed system in FIG. 5 has, for example, a substantially rectangular shape with lengths of its longitudinal and lateral sides being different so as to be able to transmit and receive desired circularly polarized waves. Note that the term "substantially rectangular" refers to a shape included in the term "substantially quadrilateral" described above. Thus, the "center point 35*p* of the radiating element 35" is a point at which diagonal lines of the radiating element 35 intersect. Note that the term "substantially rectangular" refers to a shape included in the term "substantially quadrilateral" described above.

FIGS. 3 to 5 illustrate a configuration in which there is only one feed line 42 serving as a feed line coupled to the radiating element 35, however, two feed lines may be provided by adding a feed line coupled to the radiating element 35. Note that the additional feed line can be provided via a through-hole (not illustrated) penetrating through the dielectric member 34 and the like, similarly to the feed line 42, and thus a description of a detailed configuration thereof is omitted here.

FIG. 6 is a diagram illustrating the positions of the feed points 43*a* in the radiating element 35 of a double-feed system. Note that the positions of the two feed points 43*a* in FIG. 6 are merely an example, and may be any positions suitable for the radiating element 35 to transmit and receive desired circularly polarized waves. Further, for example, the radiating element 35 in FIG. 6 has a substantially square shape with the longitudinal and lateral lengths thereof being equal so as to be able to transmit and receive desired circularly polarized waves. Note that the term "substantially square" refers to a shape included in the term "substantially quadrilateral" described above.

<<<Overview of Parasitic Elements>>>

The parasitic elements 36 to 39 are conductive bar-shaped members obtained by being bent into L shapes as illustrated in FIG. 3. The parasitic elements 36 to 39 are provided at the base 11, in the surrounding region of the radiating element 35 of the patch antenna 30. Because the parasitic elements 36 to 39 and the base are electrically coupled to each other, the parasitic elements 36 to 39 are each grounded.

Although details will be given later, the term "surrounding region of the radiating element 35" refers to a range in which the parasitic elements 36 to 39 are away from the outer edge of the radiating element 35 to such a degree that the gain of the patch antenna 30 at low elevation angles of the patch antenna 30 is higher than in a case without the parasitic elements 36 to 39. In an embodiment of the present disclosure, the term "surrounding region of the radiating element 35" refers to, for example, a range from the outer edge of the radiating element 35 up to a position that is away therefrom by a quarter of a wavelength used. Further, the "wavelength used" is a wavelength corresponding to a desired frequency in a desired frequency band used for the patch antenna 30, and is specifically a wavelength corresponding to, for example, the center frequency in a desired frequency band.

The parasitic elements 36 to 39 are provided away outward from the outer edge of the radiating element 35, and the distances from the parasitic elements 36 to 39 to the outer edge of the radiating element 35 are equal to one another. Note that outward with respect to the radiating element 35 is in a direction away from the center point 35*p* of the radiating element 35 in the base 11. Further, although details will be described later, the characteristics of the patch antenna 30 can be adjusted by changing the distances from the parasitic elements 36 to 39 to the outer edge of the radiating element 35.

The parasitic element 36 has a pillar portion 36*a* and an extension portion 36*b*. The pillar portion 36*a* is provided perpendicularly upright to the base 11, in the surrounding region of the main body part of the patch antenna 30. Note that the pillar portion 36*a* is perpendicular not only to the base 11 but also to the radiation surface of the radiating element 35. Accordingly, the pillar portion 36*a* extends in the Z-axis direction.

The base end of the pillar portion 36*a* (one end of the pillar portion 36*a*) is electrically coupled to the base 11 and grounded. The extension portion 36*b* extends from the top portion of the pillar portion 36*a* (the other end of the pillar portion 36*a*) in a direction orthogonal to the pillar portion 36*a*. Then, in an embodiment of the present disclosure, the total length of the parasitic element 36 is equal to or smaller than a quarter of the wavelength used, or more preferably, slightly smaller than a quarter of the wavelength used. Note that the "total length of the parasitic element" is, for example, the length along the pillar portion 36*a* and the extension portion 36*b*, measured from the base end of the pillar portion 36*a* to the tip end of the extension portion 36*b*. Further, the base end of the pillar portion 36*a* corresponds to the "grounded end portion."

With the total length of the grounded parasitic element 36 is being set to substantially a quarter of the wavelength used as such, the parasitic element 36 functions as a director. Note that the parasitic element 36 can also be used as a director by not being grounded and by having a total length of substantially a half of the wavelength used. However, when the parasitic element 36 is not grounded, the parasitic element 36 does not achieve the reflection effect, resulting in an increase in the total length thereof. For this reason, the use of the grounded parasitic element 36 can reduce the size of the patch antenna 30.

Each of the parasitic elements 37 to 39 is an element similar to the parasitic element 36. Specifically, the parasitic element 37 has a pillar portion 37*a* and an extension portion 37*b*, and the parasitic element 38 has a pillar portion 38*a* and an extension portion 38*b*. Further, the parasitic element 39 has a pillar portion 39*a* and an extension portion 39*b*. Thus, detailed descriptions of the parasitic elements 37 to 39 are omitted.

<<<Installation Conditions for Parasitic Elements>>>

The parasitic elements 36 to 39 operate as directors, and the radiating element 35 receives left circularly polarized waves in the 2.3 GHz band. Accordingly, the radio waves received by the radiating element 35 are affected by change in the positions and directions of installation of the parasitic elements 36 to 39. Thus, first, installation conditions for the parasitic elements 36 to 39 are described with reference to FIG. 6. Note that, in FIG. 6, the direction of rotation of the left circularly polarized waves received by the radiating element 35 is given by an arrow A.

==Distances from Outer Edge of Radiating element to Pillar Portions and Extension Portions==

As illustrated in FIG. 6, the pillar portions 36*a* to 39*a* are each spaced apart outward from the outer edge of the radiating element 35 and are parallel to a normal line to the radiating element 35, in other words, parallel to the Z-axis.

Further, the parasitic element 36 is attached such that the extension portion 36*b* extending from the top portion of the pillar portion 36*a* is parallel to a side 35*a* of the radiating element 35, the side 35*a* being closest to the extension portion 36*b*. Accordingly, in plan view when the front surface of the radiating element 35 is seen from the positive Z-axis direction, the "distance D" between the parasitic element 36 and the radiating element 35 is a distance from the extension portion 36*b* (or the pillar portion 36*a*) to the side 35*a* of the radiating element 35 closest to the parasitic element 36. Note that the distance D corresponds to the "predetermined distance.

Note that the parasitic elements 37 to 39 are installed as in the parasitic element 36. Although details will be described later, the parasitic elements 36 to 39 are provided at the base 11 such that the distance D with respect to each of the parasitic elements 36 to 39 is three-sixteenths of the wavelength used. Although the parasitic elements 37 to 39 have the same distance D in an embodiment of the present disclosure, the present disclosure is not limited to this. For example, the parasitic elements 37 to 39 may have different distances D. Further, some of the parasitic elements 37 to 39 may have the same distance D.

==Directions in which Extension Portions Extend==

As illustrated in FIG. 6, the extension portions 36*b* to 39*b* extend, respectively from the top portions of the pillar portions 36*a* to 39*a*, in the direction of rotation of left circularly polarized waves so as to be along the direction of rotation of left circularly polarized waves. In other words, as seen in the negative Z-axis direction, the extension portions 36*b* to 39*b* extend counterclockwise from the pillar portions 36*a* to 39*a*, respectively. Note that although details will be described later, with the parasitic elements 36 to 39 being installed in such directions, the gain of the patch antenna 30 at low elevation angles can be improved.

Further, when the patch antenna 30 is one to receive right circularly polarized waves, the parasitic elements 36 to 39 are installed such that the extension portions 36*b* to 39*b* extend clockwise respectively from the pillar portions 36*a* to 39*a*, as seen in the negative Z-axis direction.

==Height==

In an embodiment of the present disclosure, a "height" is, for example, a distance from the base 11 to a target. For example, in FIG. 4, the distances from the grounded base ends of the pillar portions 36*a* to 39*a*, in other words, the base 11, to the top portions of the pillar portions 36*a* to 39*a* are each defined as the "height H." Here, the heights H of the pillar portions 36*a* to 39*a* are adjusted such that the height from the base 11 to the top portions of the pillar portions 36*a* to 39*a* in the Z-axis direction is equal to the height from the base 11 to the radiating element 35 in the Z-axis direction. Thus, the height from the base 11 to the extension portions 36*b* to 39*b* in the Z-axis direction is also equal to the height from the base 11 to the radiating element 35 in the Z-axis direction. Accordingly, in the patch antenna 30, the positions of the extension portions 36*b* to 39*b* in the Z-axis direction are aligned with the position of the radiating element 35 in the Z-axis direction, and the extension portions 36*b* to 39*b* and the radiating element 35 are on the same XY plane.

==Positions and Offsets of the Extension Portions==

Further, as illustrated in FIG. 6, the distance by which a target is offset in the X-axis direction from the position of the midpoint of a side 35*b* (or a side 35*d*) of the radiating element 35 in the X-axis direction is referred to as offset amount in the X-axis direction. Furthermore, the distance by which a target is offset in the Y-axis direction from the position of the midpoint of the side 35*a* (or a side 35*c*) of the radiating element 35 in the Y-axis direction is referred to as offset amount in the Y-axis direction.

In the example of FIG. 6, the offset amount in the X-axis direction of the midpoint of each of the extension portions 37*b*, 39*b* in the X-axis direction is 0 mm. In other words, the position of the midpoint of each of the extension portions 37*b*, 39*b* in the X-axis direction is aligned with the position of the midpoint of the side 35*b* of the radiating element 35 in the X-axis direction.

Meanwhile, the offset amount in the Y-axis direction of the midpoint of each of the extension portions 36*b*, 38*b* in the Y-axis direction is 0 mm. In other words, the position of the midpoint of each of the extension portions 36*b*, 38*b* in the Y-axis direction is aligned with the position of the midpoint of each of the sides 35*a*, 35*c* of the radiating element 35 in the Y-axis direction.

==Reference Conditions==

Here, the gain of the patch antenna 30 and the gain of a patch antenna of a comparative example (hereinafter referred to as patch antenna X) were calculated under the conditions in Table 1 (hereinafter referred to as "reference conditions"). Note that the patch antenna X (not illustrated) is an antenna corresponding to the patch antenna 30 without parasitic elements 36 to 39, in other words, an antenna that uses only the main body part of the patch antenna 30. Further, for the sake of convenience, in models used for the simulations of the patch antenna 30 and the patch antenna X, the circuit pattern 31*a* and the like, which have little effect on the gain, are omitted.

TABLE 1

| | |
|---|---|
| Size of dielectric member 34 | 28 mm × 28 mm |
| Size of radiating element 35 | 20 mm × 20 mm |
| Total thickness of dielectric member 34 and radiating element 35 | 6 mm |
| Height from surface of base 11 to surface of radiating element 35 | 13 mm |
| Size of base 11 | 300 mm × 300 mm |
| Size of circuit board 32 | 35 mm × 35 mm |
| Total length of each of parasitic elements 36 to 39 | 29 mm |
| Feed system | Double-feed system |
| Radio waves | Left circularly polarized waves |
| Frequency of radio waves | 2332.5 MHz |
| Directions in which extension portions 36b to 39b extend | Direction of rotation of left circularly polarized waves |
| Distance D | 24 mm (3/16 × wavelength used) |
| offset amount in X-axis direction | 0 mm |
| offset amount in Y-axis direction | 0 mm |
| Height H | 13 mm |

Figure 7:
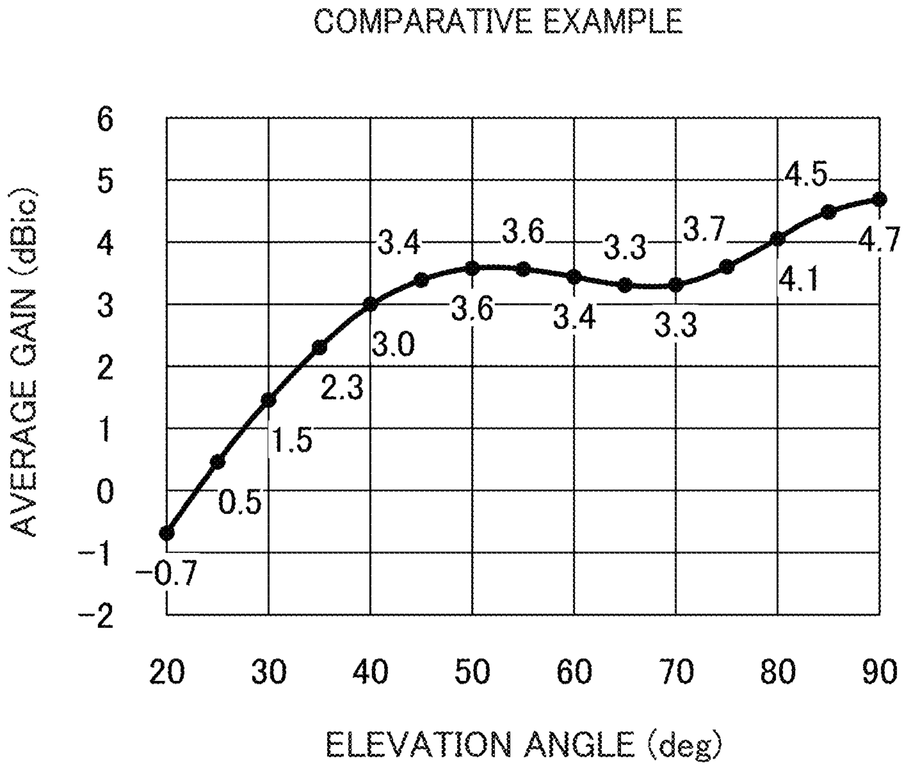
FIG. 7 is a chart of a relationship between elevation angle and average gain of a patch antenna X used for comparison.
Figure 8:
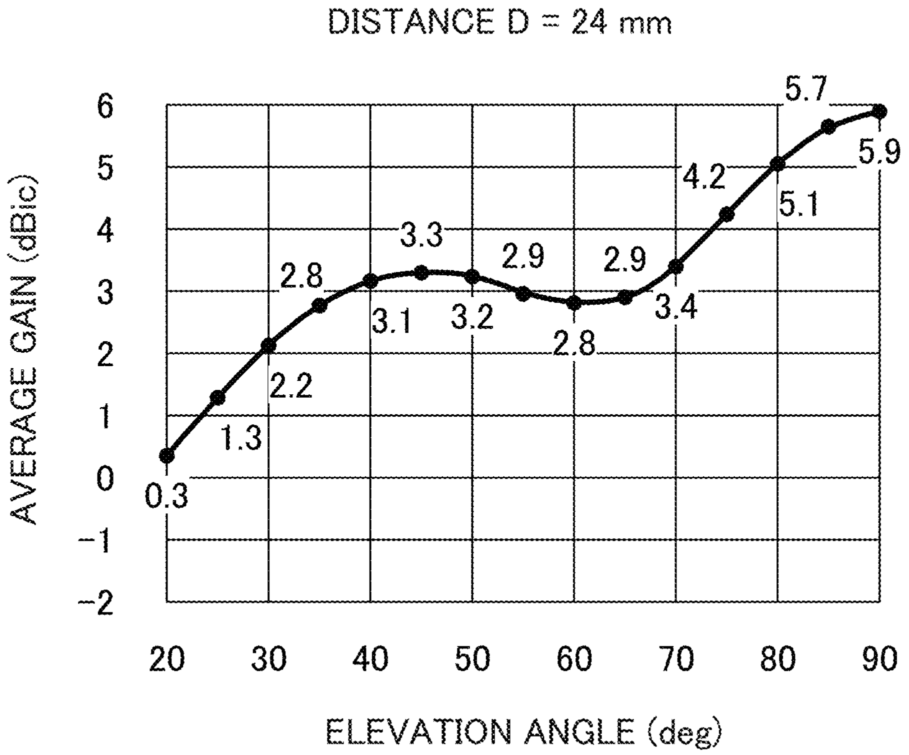
FIG. 8 is a chart of a relationship between elevation angle and average gain of a patch antenna 30.

FIG. 7 illustrates calculation results of the patch antenna X, and FIG. 8 illustrates calculation results of the patch antenna 30 in which the parasitic elements 36 to 39 are installed. FIGS. 7 and 8 are charts illustrating the relationship between elevation angle and average gain. In these charts, the horizontal axis represents the elevation angle, and the vertical axis represents the average gain. As illustrated in FIG. 7, in the patch antenna X, the average gains at the elevation angles 20°, 25°, and 30° are −0.7 dBic, 0.5 dBic, and 1.5 dBic, respectively. In contrast, as illustrated in FIG. 8, in the patch antenna 30 in which the parasitic elements 36 to 39 are installed, the average gains at the elevation angles 20°, 25°, and 30° are 0.3 dBic, 1.3 dBic, and 1.2 dBic, respectively. Accordingly, the patch antenna 30 in which the parasitic elements 36 to 39 are installed has higher average gains than the patch antenna X at the low elevation angles from 20° to 30°.

In this way, with the grounded parasitic elements 36 to 39 being provided in the surrounding region of the radiating element 35, the gain of the patch antenna 30 at low elevation angles is improved. As a result, the patch antenna 30 can efficiently receive incoming radio waves at low elevation angles.

<<<Change in Installation Conditions of Parasitic Elements>>>

Here, a description is given of cases where the installation conditions of the parasitic elements are changed. Note that two or more of the conditions described below may be changed and the combination thereof may be applied.

==When Distance D is Changed==

First, the characteristics of the patch antenna 30 are verified, when the distance D is changed among the installation conditions of the parasitic elements 36 to 39. Note that the various conditions of the patch antenna 30 except for the distance D (e.g., the physical sizes of the main components of the patch antenna 30, the feed system) and the like are the same as the reference conditions described earlier.

Figure 9:
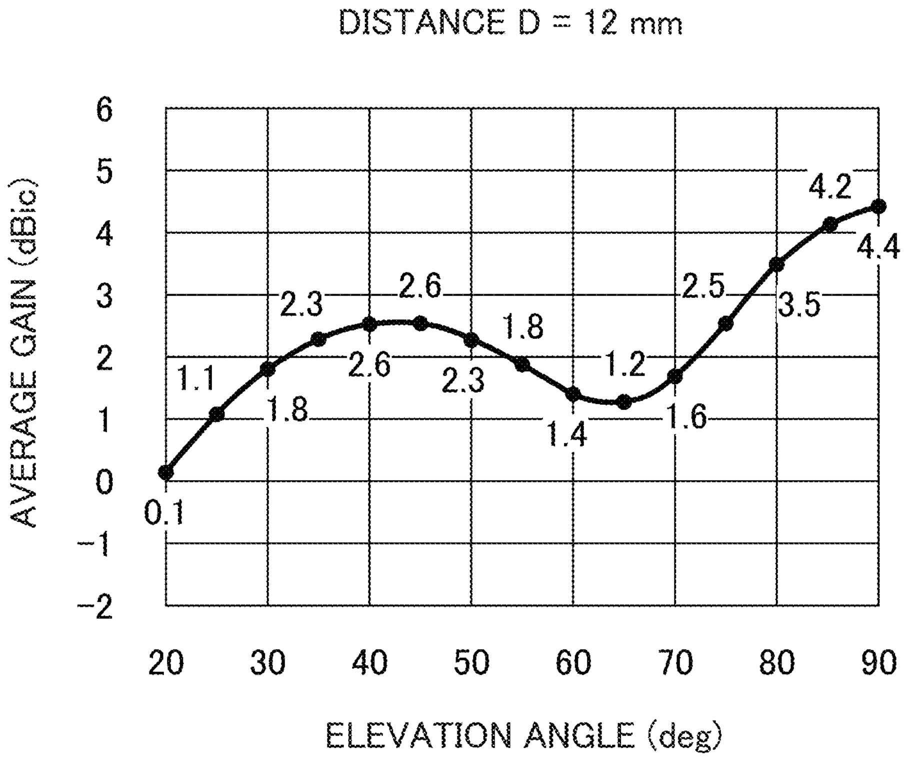
FIG. 9 is a chart of a relationship between elevation angle and average gain of a patch antenna 30.
Figure 10:
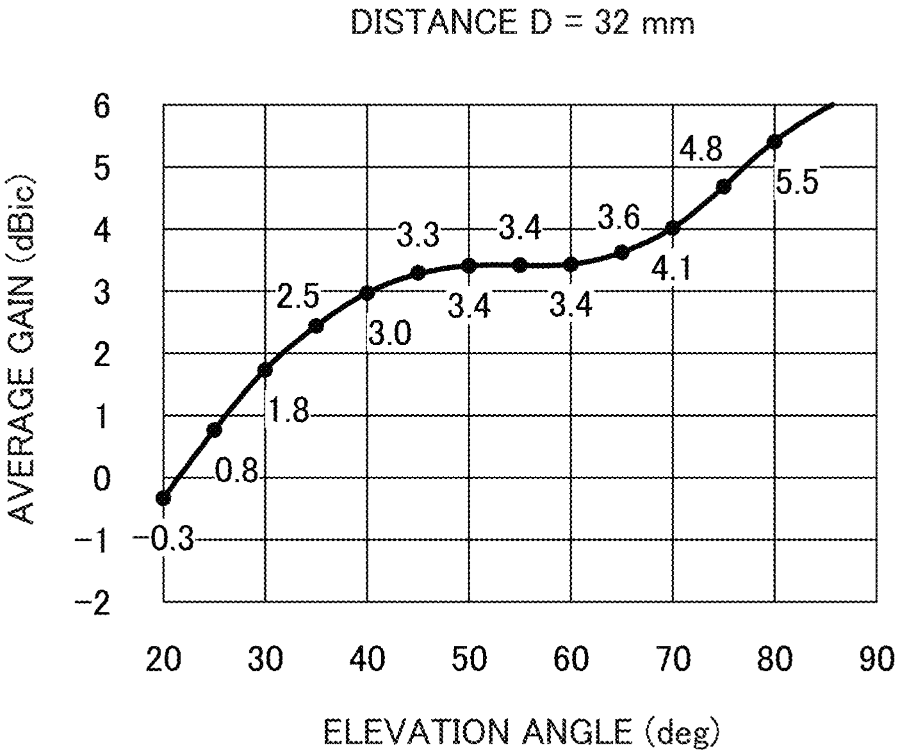
FIG. 10 is a chart of a relationship between elevation angle and average gain of a patch antenna 30.
Figure 11:
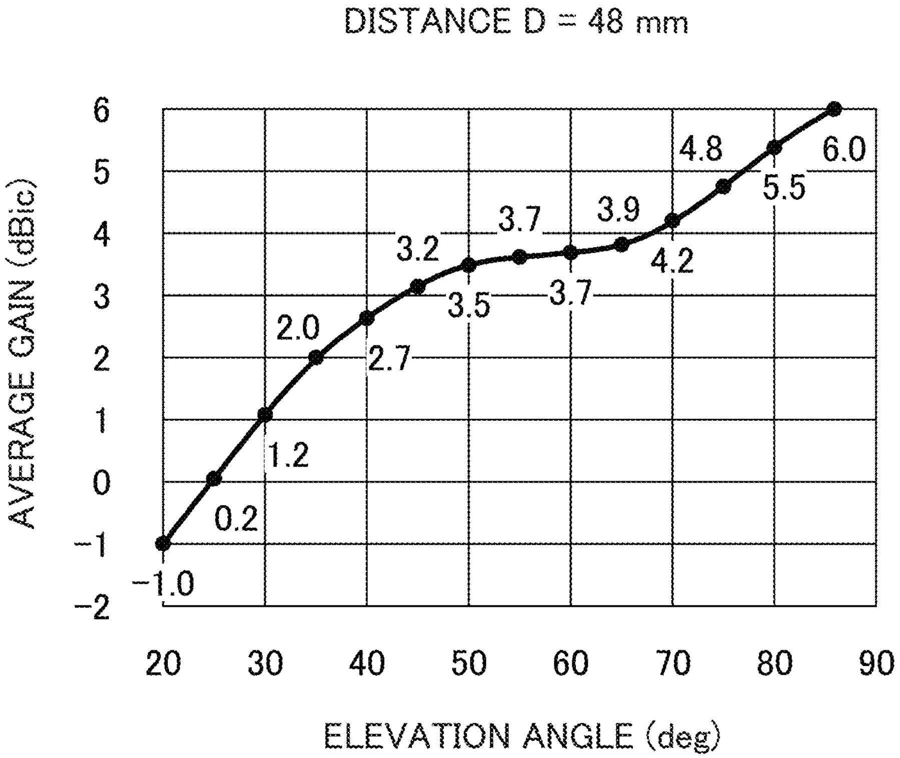
FIG. 11 is a chart of a relationship between elevation angle and average gain of a patch antenna 30.

FIGS. 9 to 11 illustrate results of changing the distance D to 12 mm (0.093×wavelength used), 32 mm (¼×wavelength used), and 48 mm (⅜×wavelength used). FIGS. 9 to 11 are charts each illustrating the relationship between elevation angle and average gain. In these charts, the horizontal axis represents the elevation angle, and the vertical axis represents the average gain. These results, the results when setting the distance D to 24 mm (3/16×wavelength used) (FIG. 8), and the results of the patch antenna X (FIG. 7) are compared.

Similarly to the patch antenna 30 in which the distance D is set to 24 mm, the patch antenna 30 in which the distance D is set to 12 mm or 32 mm has higher average gains than the patch antenna X at low elevation angles from 20° to 30°. However, the patch antenna 30 in which the distance D is set to 48 mm has lower average gains than the patch antenna X at the low elevation angles from 20° to 30°. Accordingly, in order for the extension portions 36*b* to 39*b* to contribute to improvement in gain at low elevation angles, it is preferable that the distance D from each of the extension portions 36*b* to 39*b* to the outer edge of the radiating element 35 be set to 32 mm (a quarter of the wavelength used) or smaller.

==When Feed System is Changed==

Next, a description is given of a case where the feed system of the patch antenna 30 is changed from a double-feed system to a single-feed system. Note that the reference conditions were used here except for the size and the feed system of the radiating element 35, and the gain was calculated in the patch antenna 30 and the patch antenna X that use a single-feed system. The length of the sides 35*a*, 35*c* of the radiating element 35 was set to 19.9 mm, and the length of the sides 35*b*, 35*c* was set to 21.7 mm. Further, in an embodiment of the present disclosure, as given by the dashed-two dotted line in FIG. 5, a feed point 41*a* was set at a position offset from the center point 35*p* of the radiating element 35 in the positive X-axis direction and the negative Y-axis direction.

Figure 12:
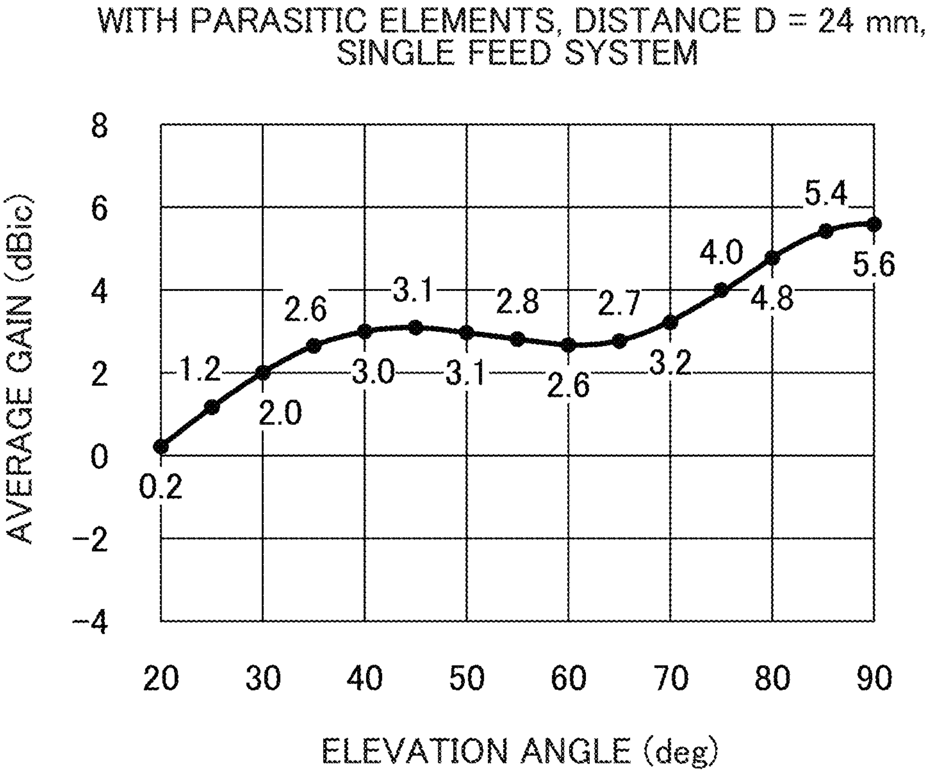
FIG. 12 is a chart of a relationship between elevation angle and average gain of a patch antenna 30 of a single-feed system.
Figure 13:
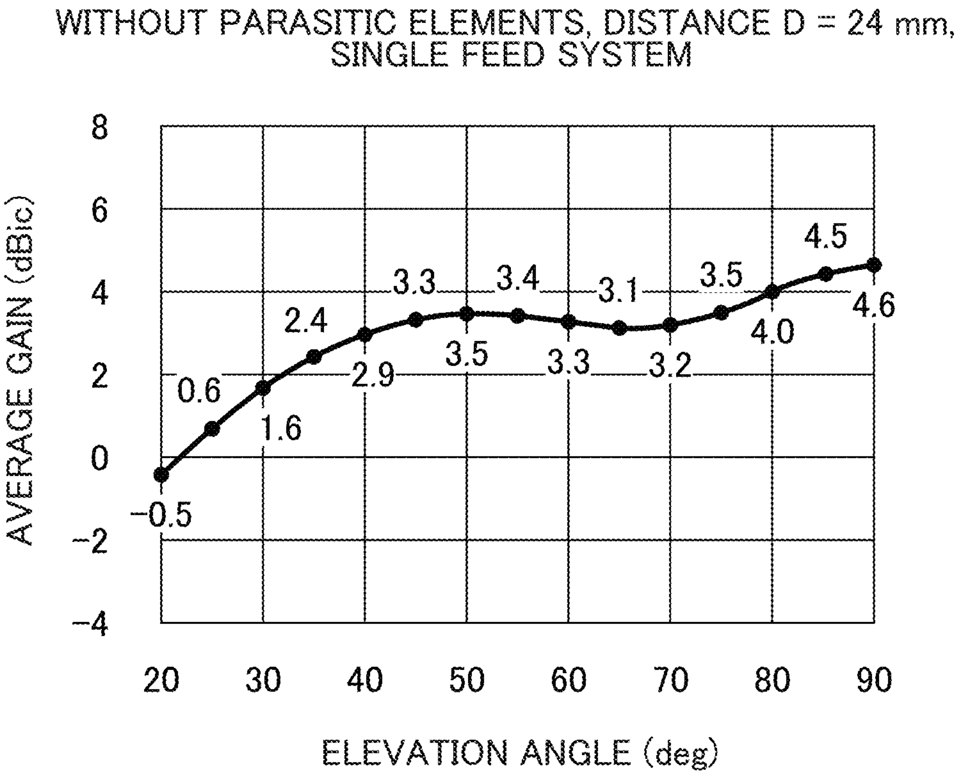
FIG. 13 is a chart of a relationship between elevation angle and average gain of a patch antenna X of a single-feed system.

FIG. 12 is a chart illustrating calculation results of the patch antenna 30 of a single-feed system, and FIG. 13 is a chart illustrating calculation results of the patch antenna X of a single-feed system. FIGS. 12 and 13 are charts each illustrating the relationship between elevation angle and average gain. As is apparent from FIGS. 7, 9, 12, and 13, the patch antenna 30 of a single-feed system can, as in the patch antenna 30 of a double-feed system, receive incoming radio waves at the low elevation angles from 20° to 30° more efficiently than the patch antenna X of a single- or double-feed system. Accordingly, irrespective of the feed system, the patch antenna 30 having the parasitic elements 36 to 39 can improve gain at low elevation angles.

==When Height H is Changed==

As illustrated in FIG. 4, in the patch antenna 30, the extension portions 36*b* to 39*b* and the radiating element 35 are on the same XY plane. However, the height H from the base 11 to the extension portions 36*b* to 39*b* may be changed such that the extension portions 36*b* to 39*b* are provided on an XY plane different from the XY plane on which the radiating element 35 exists.

Figure 14:
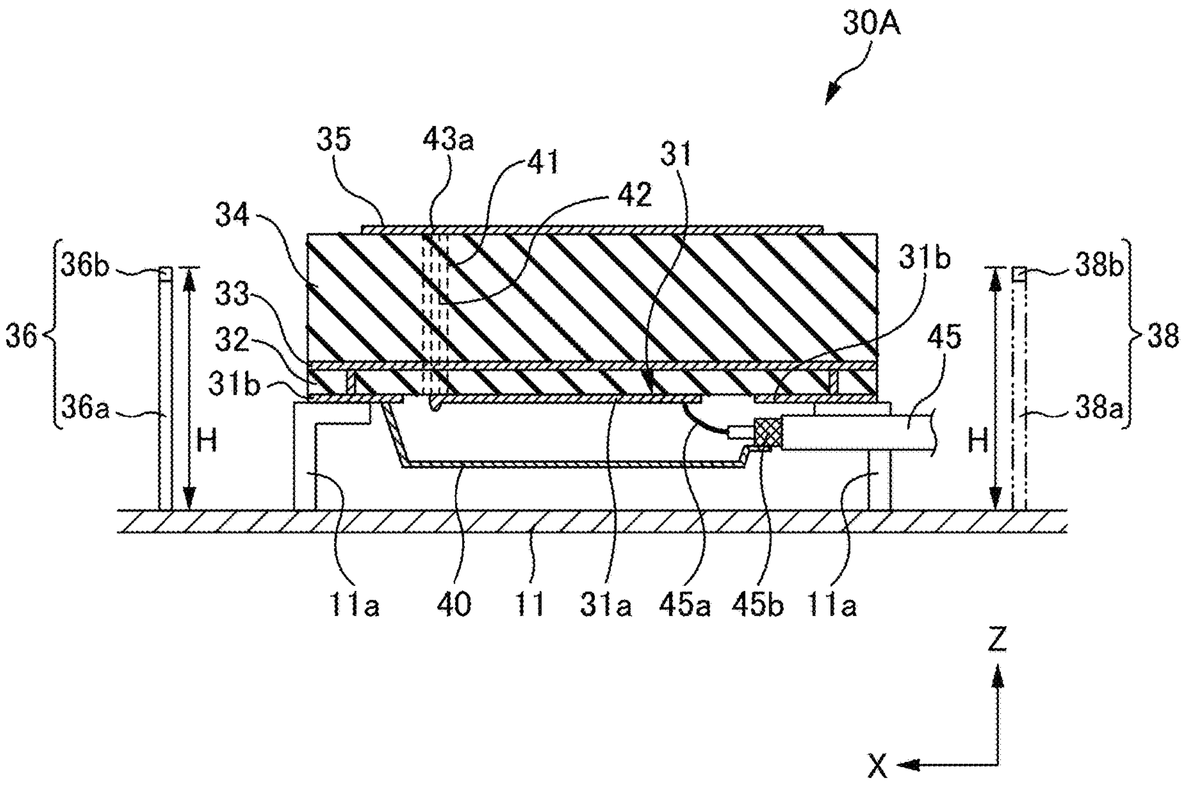
FIG. 14 is a cross-sectional view of a patch antenna 30A.

For example, in a patch antenna 30A illustrated in FIG. 14, the height of the pillar portions 36*a* to 39*a* is adjusted such that the height H is set to 9 mm and is lower than the height from the base 11 to the radiating element 35 (13 mm). Thus, the positions of the extension portions 36*b* to 39*b* in the Z-axis direction are offset in the negative Z-axis direction from the position of the radiating element 35 in the Z-axis direction.

Figure 15:
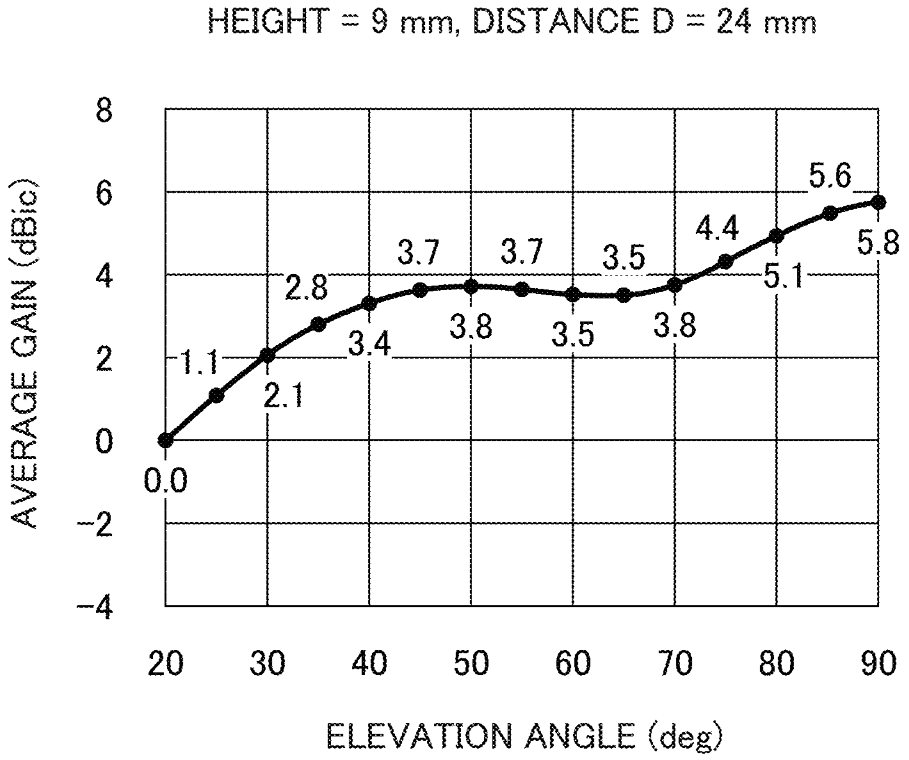
FIG. 15 is a chart of a relationship between elevation angle and average gain of a patch antenna 30A.

FIG. 15 is a chart illustrating calculation results of the patch antenna 30A in which the height H is changed from the reference condition to 9 mm. As is apparent from a comparison among FIGS. 7, 9, and 15, the patch antenna 30A can, as in the patch antenna 30, receive incoming radio waves at low elevation angles more efficiently than the patch antenna X.

Note that, here, the height H is lower than the height from the base 11 to the surface of the radiating element 15 (13 mm), however, the height H may be set to, for example, 15 mm and higher than the height therefrom to the surface of the radiating element 15. Although calculation results are omitted for the sake of convenience, such a patch antenna can also receive incoming radio waves at low elevation angles more efficiently than the patch antenna X.

When the extension portions 36*b* to 39*b* are positioned higher than the radiating element 35, the effect of improvement in the gain at low elevation angles by virtue of these parasitic elements 36 to 39 is high, but the gain at high elevation angles is likely to degrade. Meanwhile, when the extension portions 36*b* to 39*b* are positioned lower than the radiating element 35, the effect of improvement in gain at low elevation angles by virtue of the parasitic elements 36 to 39 is low, but the gain at high elevation angles is unlikely to degrade. Accordingly, the characteristics of the patch antenna 30 can be adjusted by adjustment of the height H.

Further, with the positions of the extension portions 36*b* to 39*b* being the same as or lower than the radiation surface of the radiating element 35, the height of the patch antenna 30 can be lowered. Accordingly, the height of the in-vehicle antenna device 10 including the patch antenna 30 can also be lowered.

==When Offset Amount is Changed==

Although both of the offset amount in the X-axis direction and the offset amount in the Y-axis direction in the patch antenna 30 are 0 mm as illustrated in FIGS. 5 and 6, this may be changed.

Figure 16:
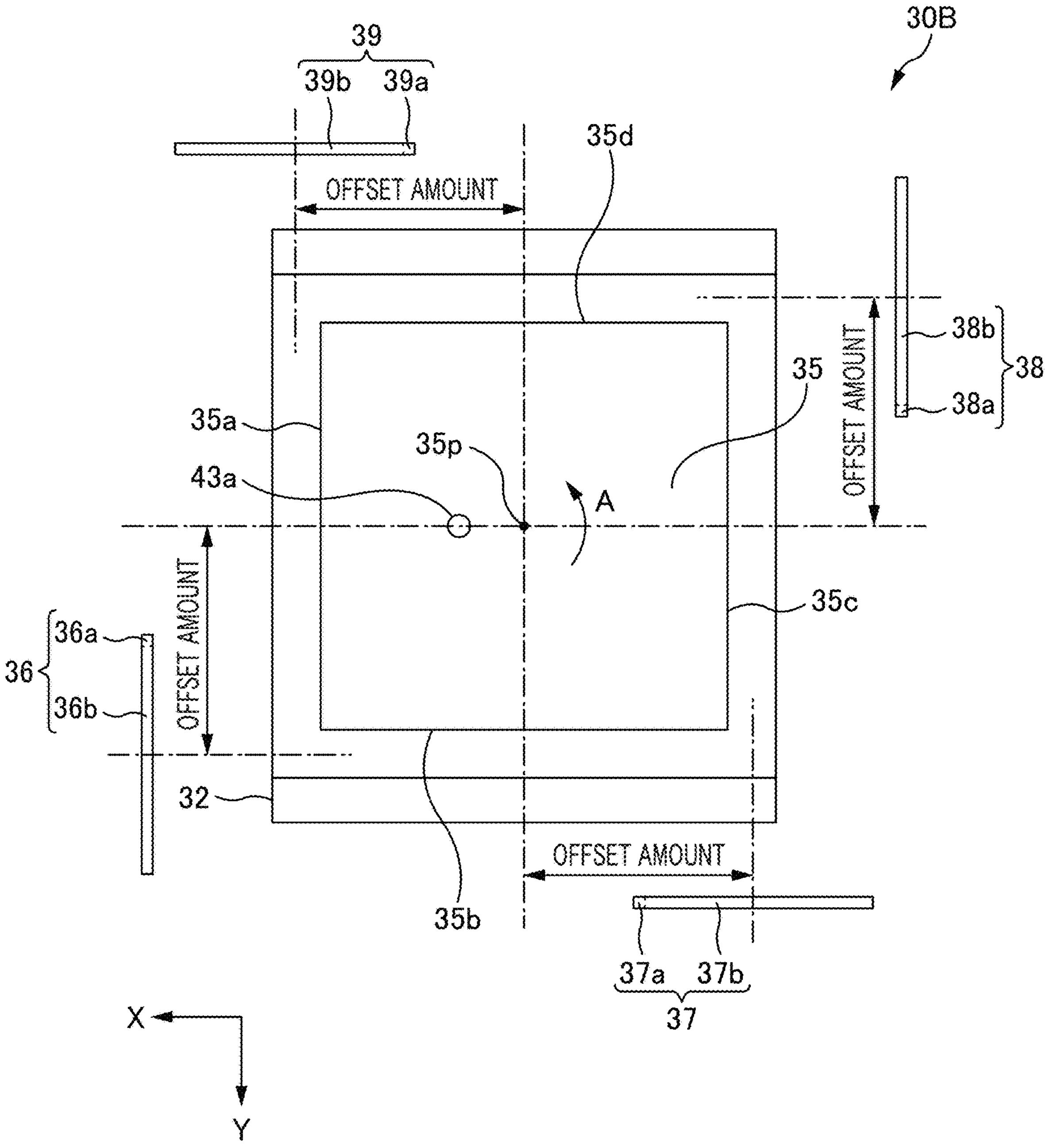
FIG. 16 is a plan view of a patch antenna 30B.
Figure 17:
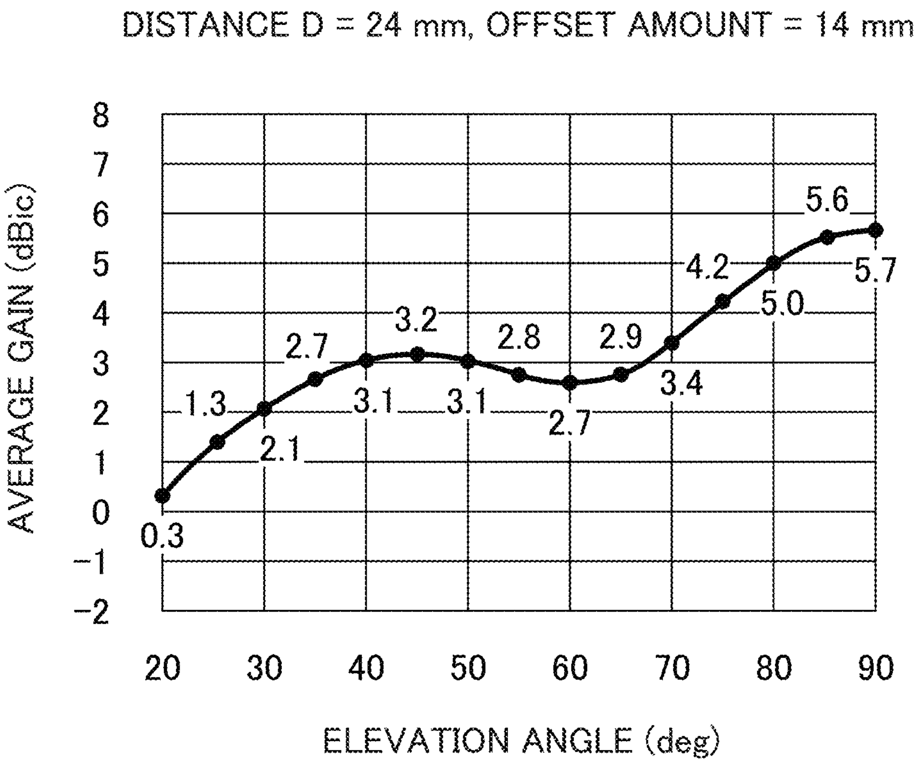
FIG. 17 is a chart of a relationship between elevation angle and average gain of a patch antenna 30B.

For example, FIG. 16 is a plan view of an example of a patch antenna 30B with the offset amounts being changed. Here, the positions of the midpoints of the extension portions 37*b*, 39*b* in the X-axis direction are offset from the positions of the midpoints of the sides 35*b*, 35*d* of the radiating element in the X-axis direction, respectively, in the direction of rotation of left circularly polarized waves. Further, the positions of the midpoints of the extension portions 36*b*, 38*b* in the Y-axis direction are offset from the positions of the midpoints of the sides 35*a*, 35*c* of the radiating element 35 in the Y-axis direction, respectively, in the direction of rotation of left circularly polarized waves. FIG. 17 is a chart illustrating the relationship between elevation angle and average gain in a case where the offset amounts in the X-axis direction and the Y-axis direction are set to 14 mm.

As is apparent from FIGS. 7, 9, and 17, the patch antenna 30B can, similarly to the patch antenna 30 without any offset, provide higher gain at low elevation angles than the patch antenna X.

Note that the positions of the midpoints of the extension portions 37*b*, 39*b* in the X-axis direction may be offset from the positions of the midpoints of the sides 35*b*, 35*d* of the radiating element 35 in the X-axis direction, in a direction opposite to the direction of rotation of left circularly polarized waves. Further, the positions of the midpoints of the extension portions 36*b*, 38*b* in the Y-axis direction may be offset from the positions of the midpoints of the sides 35*a*, 35*c* of the radiating element 35 in the Y-axis direction, in the direction opposite to the direction of rotation of left circularly polarized waves. Although detailed calculation results are omitted here, gain at low elevation angles can be improved also in such a case as described above, similarly to FIG. 17.

Incidentally, gain at low elevation angles can be improved even in a case where the offset amounts are set, as in the patch antenna 30B, for example, but this causes the extension portions 36*b* to 39*d* to protrude outside the ranges corresponding to the sides 35*a* to 35*d* of the radiating element 35, respectively. For this reason, such a configuration increases the size of the patch antenna 30B. Accordingly, it is preferable to set the offset amounts such that the extension portions 36*b* to 39*d* are within the ranges corresponding to the sides 35*a* to 35*d*, respectively. Setting the offset amounts as such can reduce the space for the patch antenna.

Further, even if the extension portions 36*b* to 39*d* are outside the ranges corresponding to the sides 35*a* to 35*d* of the radiating element 35, respectively, the space for the patch antenna can be reduced as long as the extension portions 36*b* to 39*d* are inside the ranges corresponding to the respective sides of the dielectric member 34. Accordingly, the extension portions 36*b* to 39*d* at least should be inside the ranges corresponding to the respective sides of the dielectric member 34.

==When Direction is Changed==

As illustrated in FIG. 3, in the patch antenna 30 described above, the directions in which the extension portions 36*b* to 39*b* extend respectively from the pillar portions 36*a* to 39*a* are the same as the direction of rotation of left circularly polarized waves to be received; however, the present disclosure is not limited to this. Note that the directions in which the extension portions 36*b* to 39*b* extend respectively from the pillar portions 36*a* to 39*a* are referred to simply as the directions of the extension portions 36*b* to 39*b*.

Figure 18:
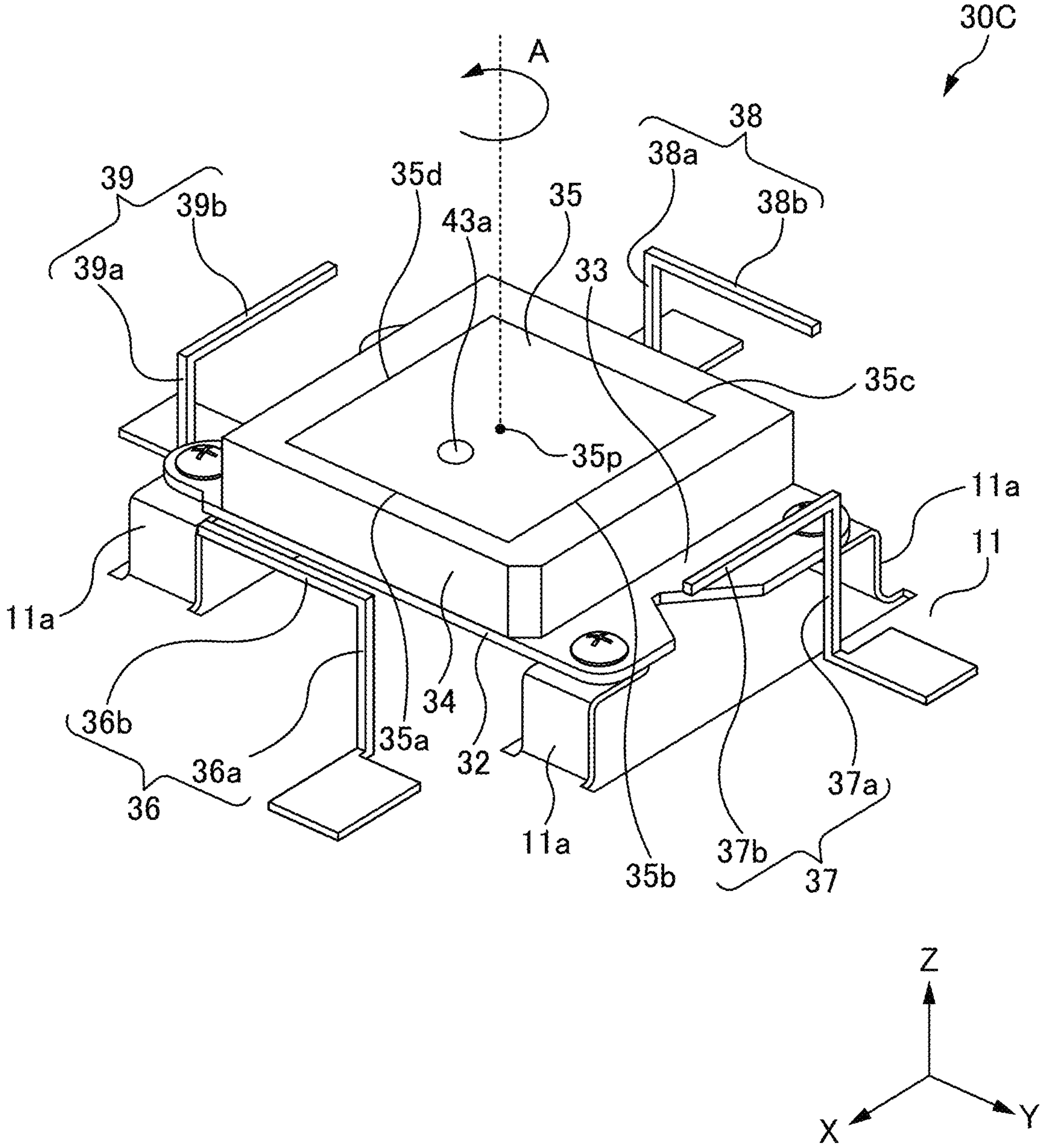
FIG. 18 is a perspective view of a patch antenna 30C.

For example, in the patch antenna 30C illustrated in FIG. 18, the directions of the extension portions 36*b* to 39*b* are the opposite to the direction of rotation of the circularly polarized waves to be received.

Figure 19:
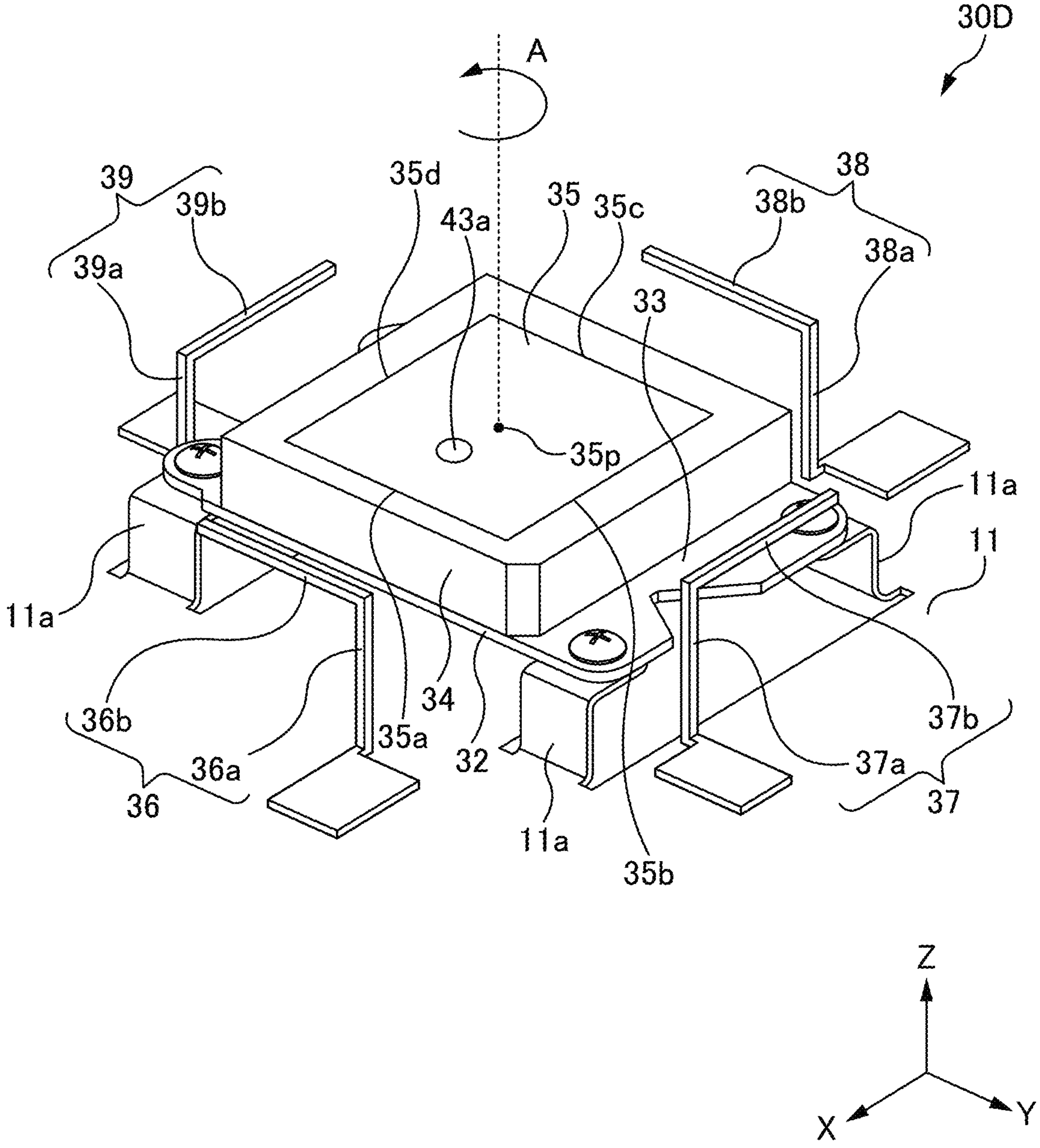
FIG. 19 is a perspective view of a patch antenna 30D.

In the patch antenna 30D illustrated in FIG. 19, the directions of the extension portions 37*b*, 38*b* are the same as the direction of rotation of circularly polarized waves to be received. Meanwhile, the directions of the extension portions 36*b*, 39*b* are opposite to the direction of rotation of circularly polarized waves to be received.

Figure 20:
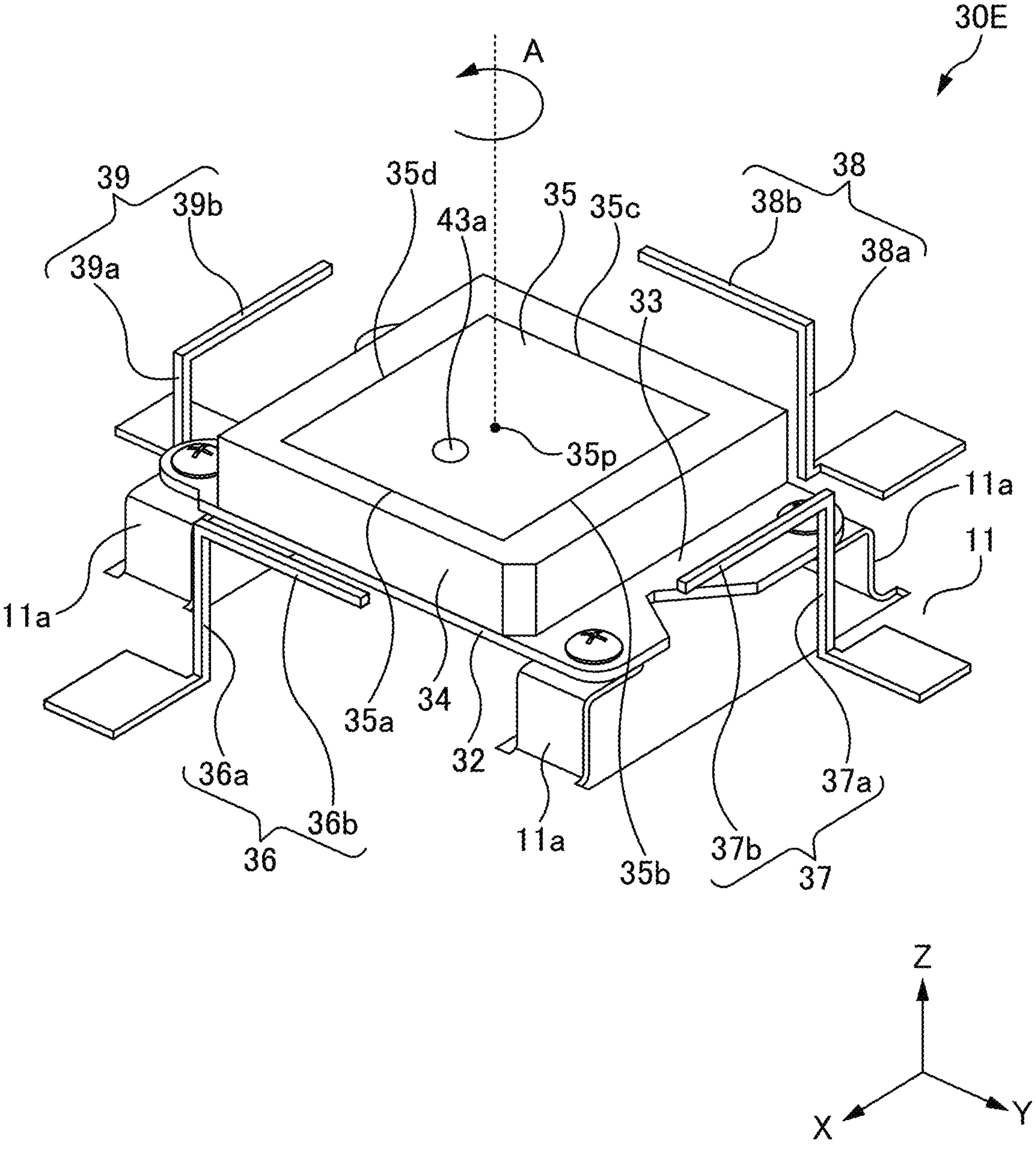
FIG. 20 is a perspective view of a patch antenna 30E.

In the patch antenna 30E illustrated in FIG. 20, the directions of the extension portions 37*b*, 39*b* are opposite to the direction of rotation of circularly polarized waves to be received. Meanwhile, the directions of the extension portions 36*b*, 38*b* are the same as the direction of rotation of circularly polarized waves to be received. Thus, in the patch antenna 30E, the tip of the extension portion 36*b* and the tip of the extension portion 37*b* face each other, and the tips of the extension portion 38*b* and the extension potion 39*b* face each other.

Figure 21:
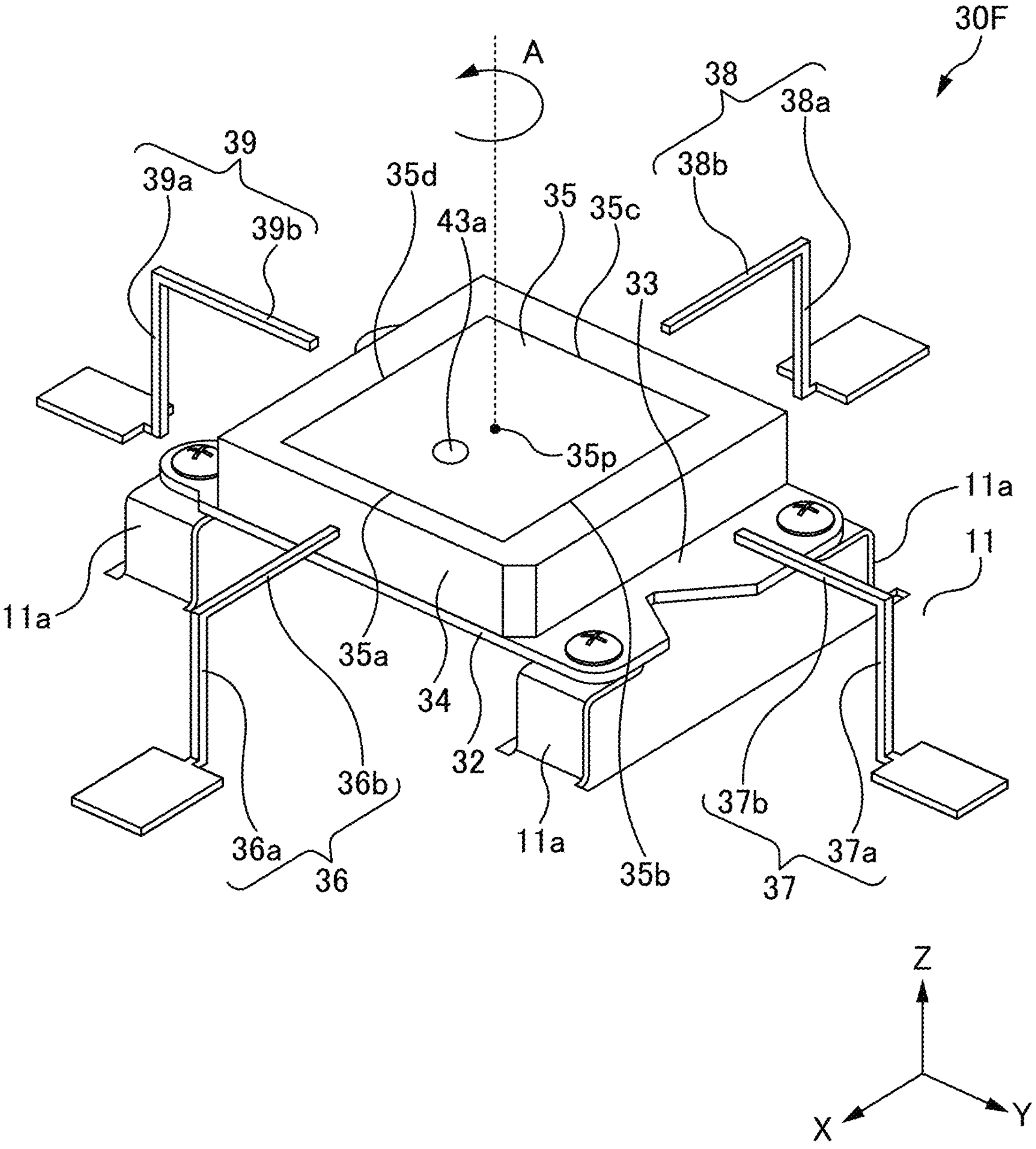
FIG. 21 is a perspective view of a patch antenna 30F.

In the patch antenna 30F illustrated in FIG. 21, the extension portions 36*b* to 39*b* extend from the outside of the sides 35*a* to 35*d* closest to the extension portions 36*b* to 39*b*, respectively, toward the center point 35*p* of the radiating element 35. In other words, the extension portions 36*b* to 39*b* extend in a direction from the outer edges of the radiating element 35 toward the center point 35*p*. Note, however, that the tips of the extension portions 36*b* to 39*b* are at positions that do not overlap with the radiating element 35.

Note that in the patch antenna 30F, the extension portions 36*b* to 39*b* are entirely located outside the outer edges of the radiating element 35 when seen in the direction of a normal line to the radiation surface of the radiating element 35, that is, in the negative Z-axis direction. In other words, in plan view when seen in a direction orthogonal to the radiation surface of the radiating element 35 (the Z-axis direction), the parasitic elements 36 to 39 are provided at the base 11 such that the parasitic elements 36 to 39 (the extension portions 36*b* to 39*b*) does not overlap with the radiating element 35. As a result, it is possible to prevent the parasitic elements 36 to 39 from adversely affecting the radio waves from the radiating element 35.

Figure 22:
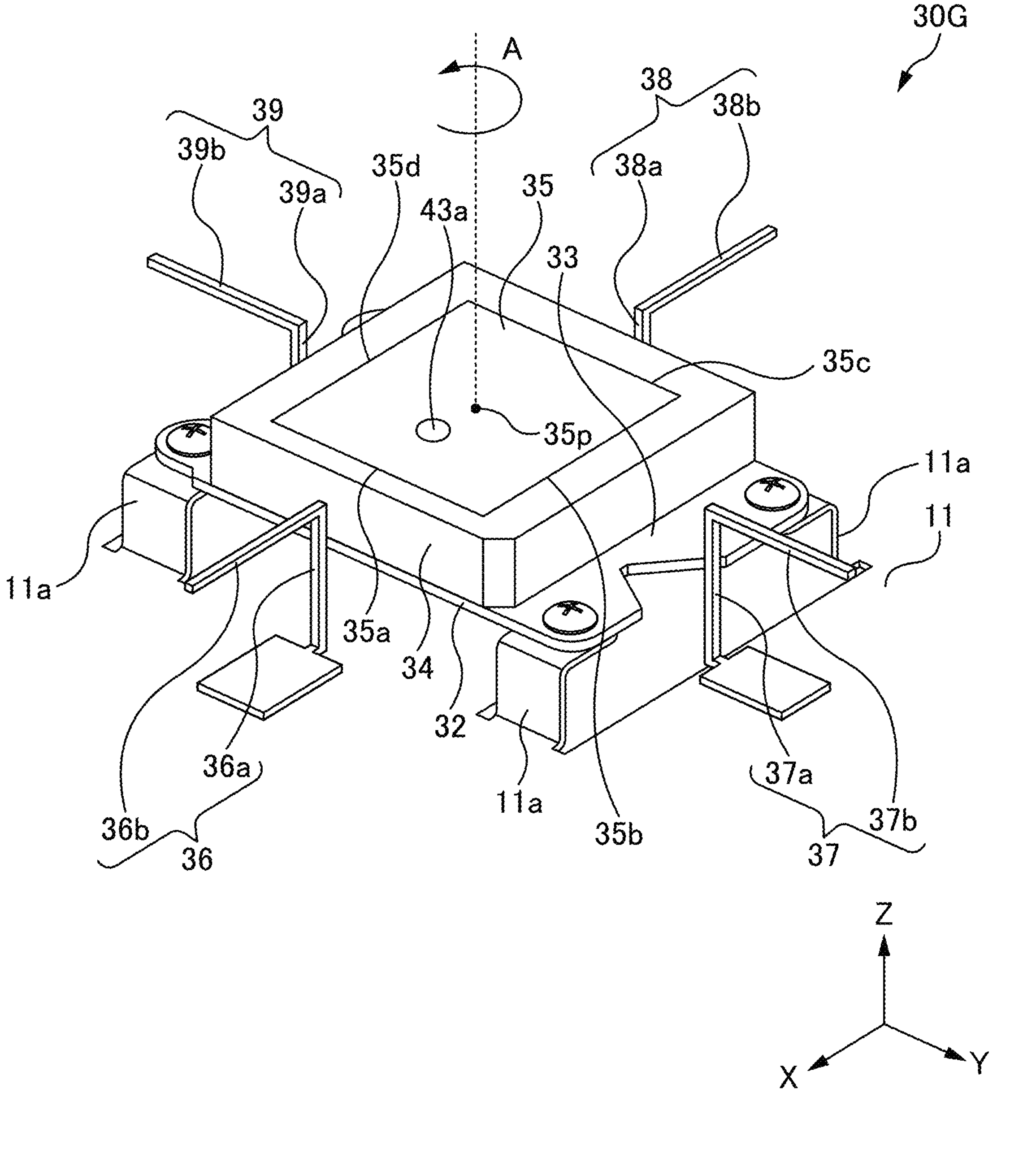
FIG. 22 is a perspective view of a patch antenna 30G.

In the patch antenna 30G illustrated in FIG. 22, the extension portions 36*b* to 39*b* extend from the outside of the sides 35*a* to 35*d* closest to the extension portions 36*b* to 39*b* toward directions opposite to the center point 35*p* of the radiating element 35, respectively.

The gains of the patch antennas 30C, 30D, 30E, 30F, and 30G were calculated. Note that the conditions were basically the same as the reference conditions in Table 1 except for the directions of the extension portions 36*b* to 39*b*. However, in the patch antennas 30F and 30G in FIGS. 21 and 22, the distance D from each of the pillar portions 36*a* to 39*a* to the outer edge of the radiating element 35 was set to 24 mm.

Figure 23:
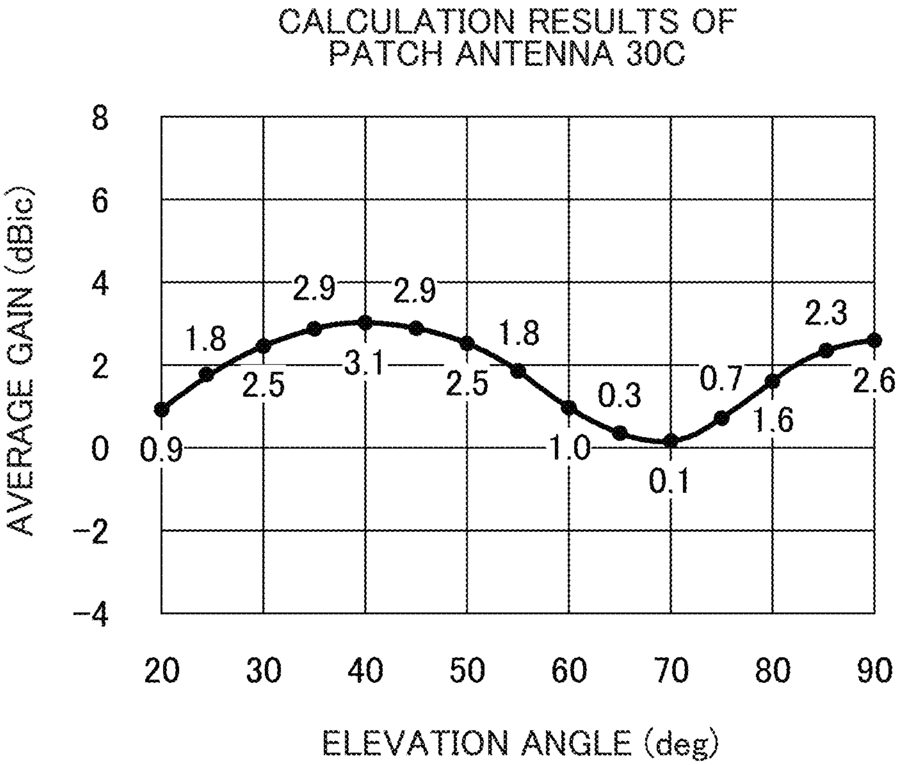
FIG. 23 is a chart of a relationship between elevation angle and average gain of a patch antenna 30C.
Figure 24:
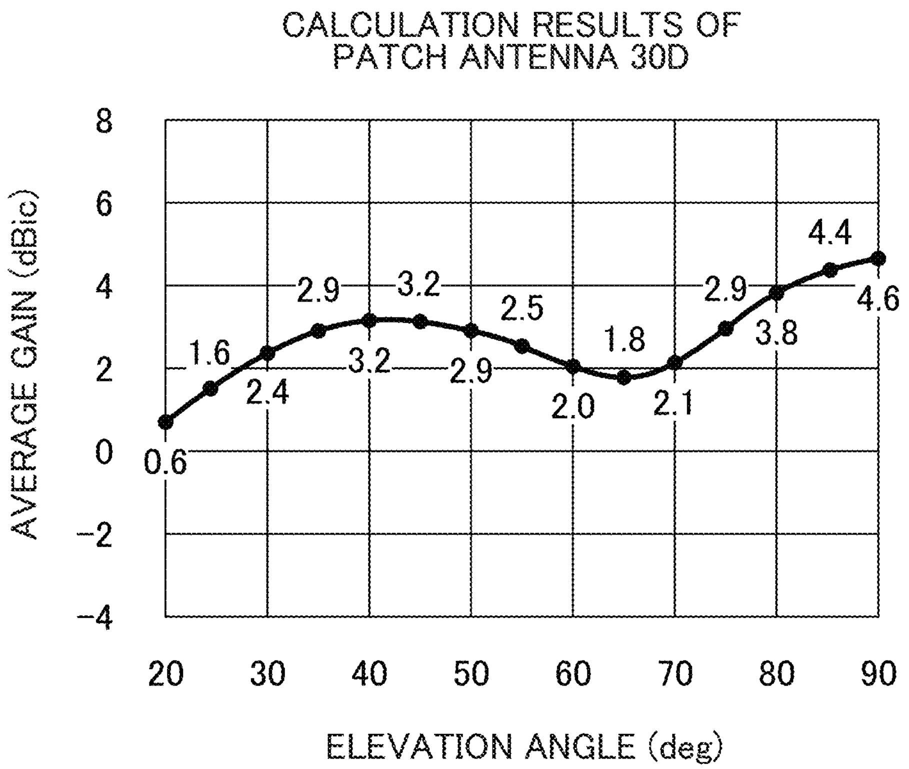
FIG. 24 is a chart of a relationship between elevation angle and average gain of a patch antenna 30D.
Figure 25:
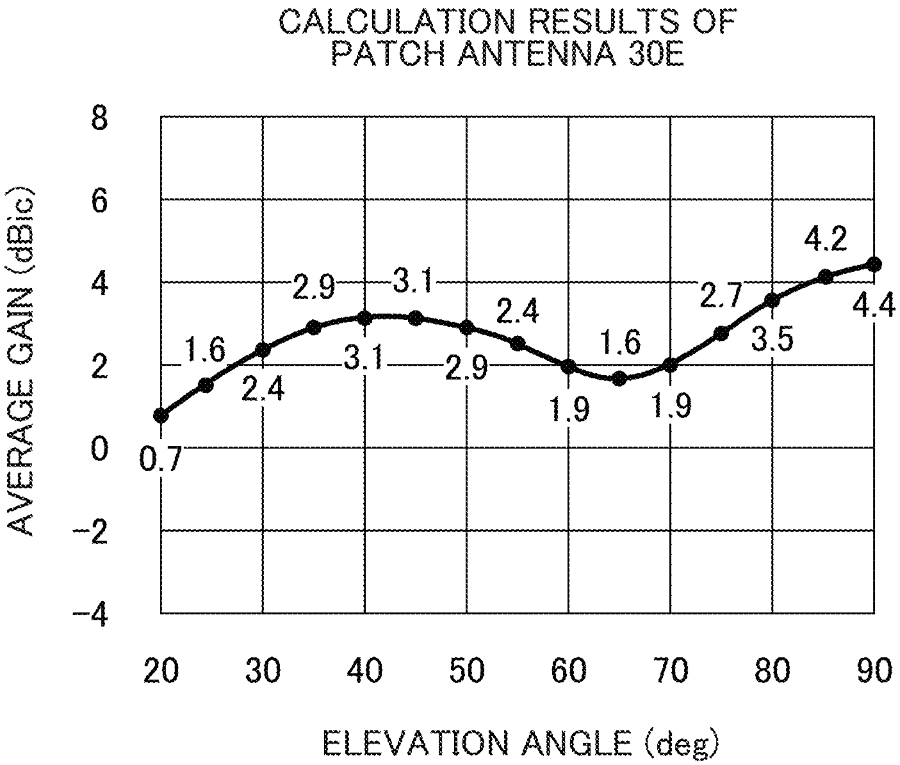
FIG. 25 is a chart of a relationship between elevation angle and average gain of a patch antenna 30E.
Figure 26:
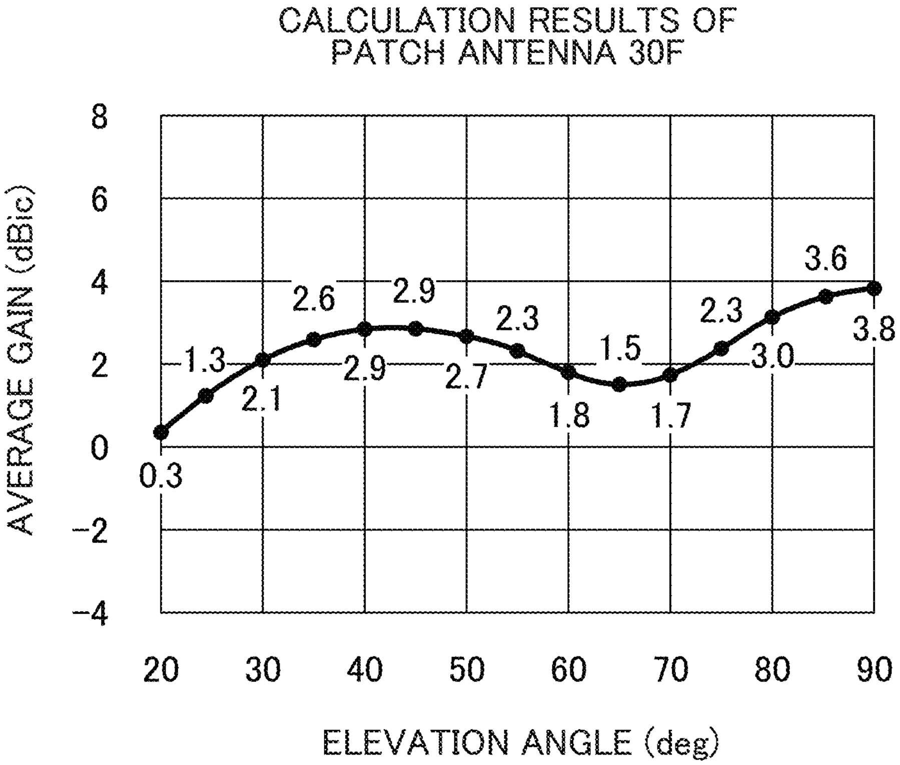
FIG. 26 is a chart of a relationship between elevation angle and average gain of a patch antenna 30F.
Figure 27:
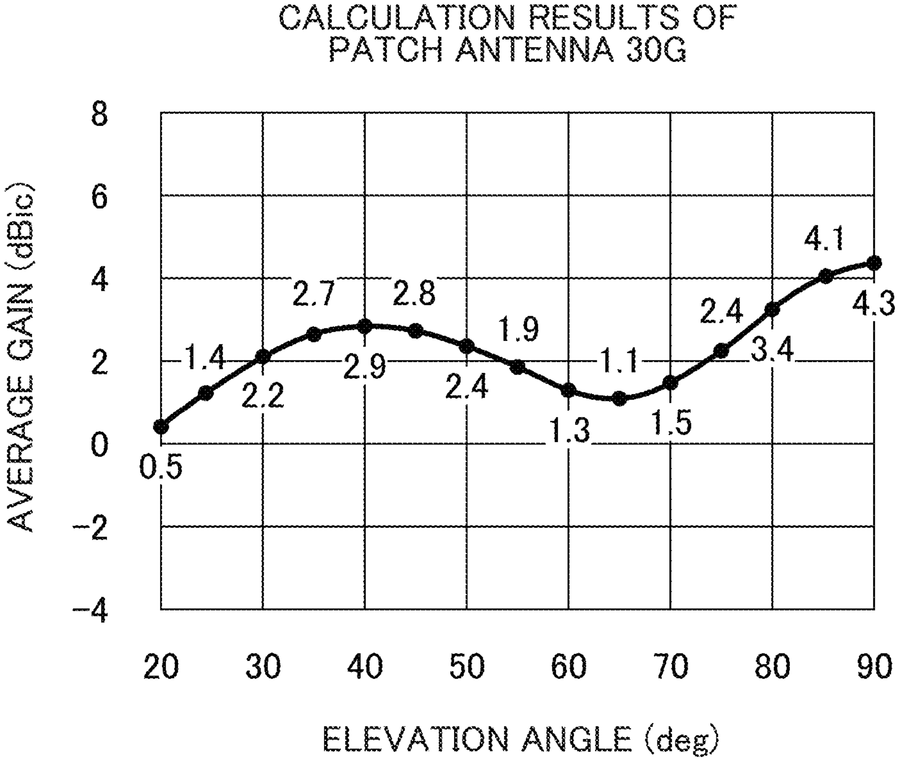
FIG. 27 is a chart of a relationship between elevation angle and average gain of a patch antenna 30G.

FIG. 23 illustrates calculation results of the patch antenna 30C in FIG. 18, FIG. 24 illustrates calculation results of the patch antenna 30D in FIG. 19, and FIG. 25 illustrates calculation results of the patch antenna 30E in FIG. 20. Further, FIG. 26 illustrates calculation results of the patch antenna 30F in FIG. 21, and FIG. 27 illustrates calculation results of the patch antenna 30G in FIG. 22.

As is apparent from a comparison among FIGS. 7 and 9 and FIGS. 23 to 27, the patch antennas 30C, 30D, 30E, 30F, and 30G in FIGS. 18 to 22 can increase gain at low elevation angles higher than the patch antenna X, as in the patch antenna 30 of FIG. 3.

A comparison is made here between the patch antenna 30 illustrated in FIG. 3 in which the directions of the extension portions 36*b* to 39*b* are the direction of rotation of left circularly polarized waves and the patch antenna 30C illustrated in FIG. 19 in which the directions of the extension portions 36*b* to 39*b* are opposite to the direction of rotation of left circularly polarized waves. As is apparent from FIG. 9 illustrating calculation results of the patch antenna 30 and FIG. 23 illustrating calculation results of the patch antenna 30C, the patch antenna 30 has higher gain than the patch antenna 30C in a range from intermediate to high elevation angles.

Accordingly, when the directions of extension of the extension portions 36*b* to 39*b* of the parasitic elements 36 to 39 are the same as the direction of rotation of circularly polarized waves, it is possible to efficiently receive incoming radio waves over the entire elevation angles from low to high elevation angles.

Further, as is apparent from a comparison between FIG. 23 illustrating calculation results of the patch antenna 30C and FIGS. 24 and 25 illustrating calculation results of the patch antenna 30D, 30E, the patch antennas 30D, 30E can receive incoming radio waves in a range from intermediate to high elevation angles more efficiently than the patch antenna 30E. Accordingly, when at least one of the extension portions 36*b* to 39*b* is directed in the same direction as the direction of rotation of circularly polarized waves, gain at low elevation angles can be improved without sacrificing gain in a range from intermediate to high elevation angles.

Further, as is apparent from a comparison between FIG. 21 illustrating calculation results of the patch antenna 30F and FIG. 22 illustrating calculation results of the patch antenna 30G, the radiation characteristics of the patch antennas 30F, 30G are almost the same therebetween. Accordingly, it is recognized that, irrespective of the directions in which the extension portions 36*b* to 39*b* extend, the extension portions 36*b* to 39*b* affect gain in a range from intermediate to high elevation angles, meanwhile the pillar portions 36*a* to 39*a* contribute to improvement in gain at low elevation angles.

==When Receiving Linearly Polarized Waves==

Although the patch antenna 30 is one to receive left circularly polarized waves, the patch antenna 30 may be receive linearly polarized waves. In such a case, the single-feed system is employed, and the feed point 41*a* is offset from the center point of the radiating element 35 in the positive X-axis direction. Then, a main polarization plane is a plane defined by a normal line to the radiating element 35 and a straight line connecting the center point of the radiating element 35 and the feed point. Thus, the main polarization plane is parallel to an XZ plane. Further, a sub main polarization plane is a plane orthogonal to the main polarization surface and also passing through the center point of the radiating element 35. Thus, a cross-polarization plane is parallel to a YZ plane.

Figure 28:
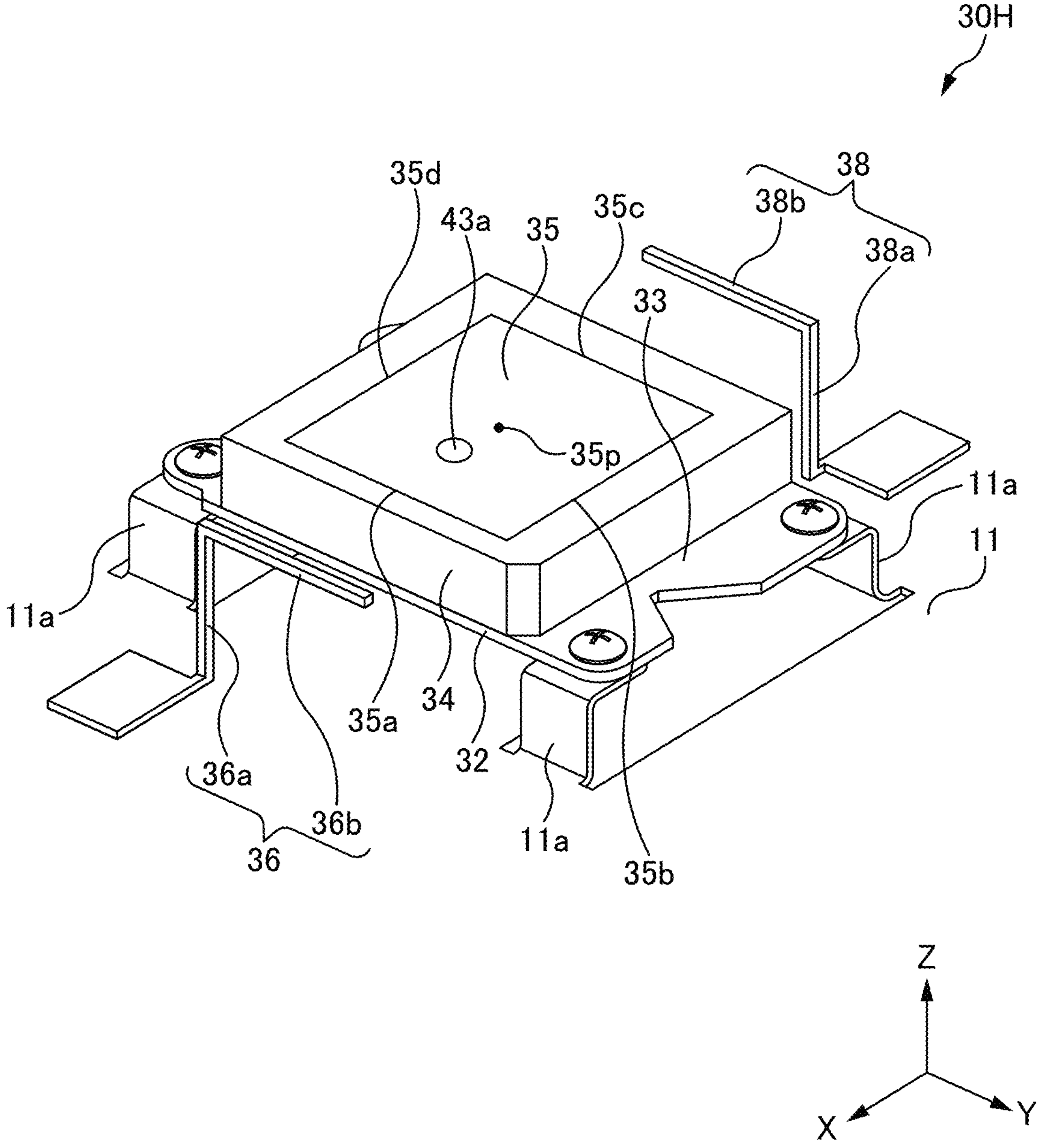
FIG. 28 is a perspective view of a patch antenna 30H.

FIG. 28 is a perspective view of a patch antenna 30H that receives linearly polarized waves. The patch antenna 30H is an antenna in which only the two parasitic elements 36, 38 are provided while the parasitic elements 37, 39 are removed from the patch antenna 30 illustrated in FIG. 3. The parasitic elements 36, 38 are provided at positions facing each other, with the radiating element 35 being interposed therebetween, in the direction of a straight line connecting the feed point 43*a* in the radiating element 35 and the center point 35*p* of the shape of the radiating element 35. Note that the distance D from each of the parasitic elements 36, 38 to the radiating element 35 is 24 mm (3/16×wavelength used). Further, in a case where the patch antenna 30H receives linearly polarized waves, the main polarization plane is an XZ plane, and the parasitic elements 36, 38 intersect the main polarization surface.

Figure 29:
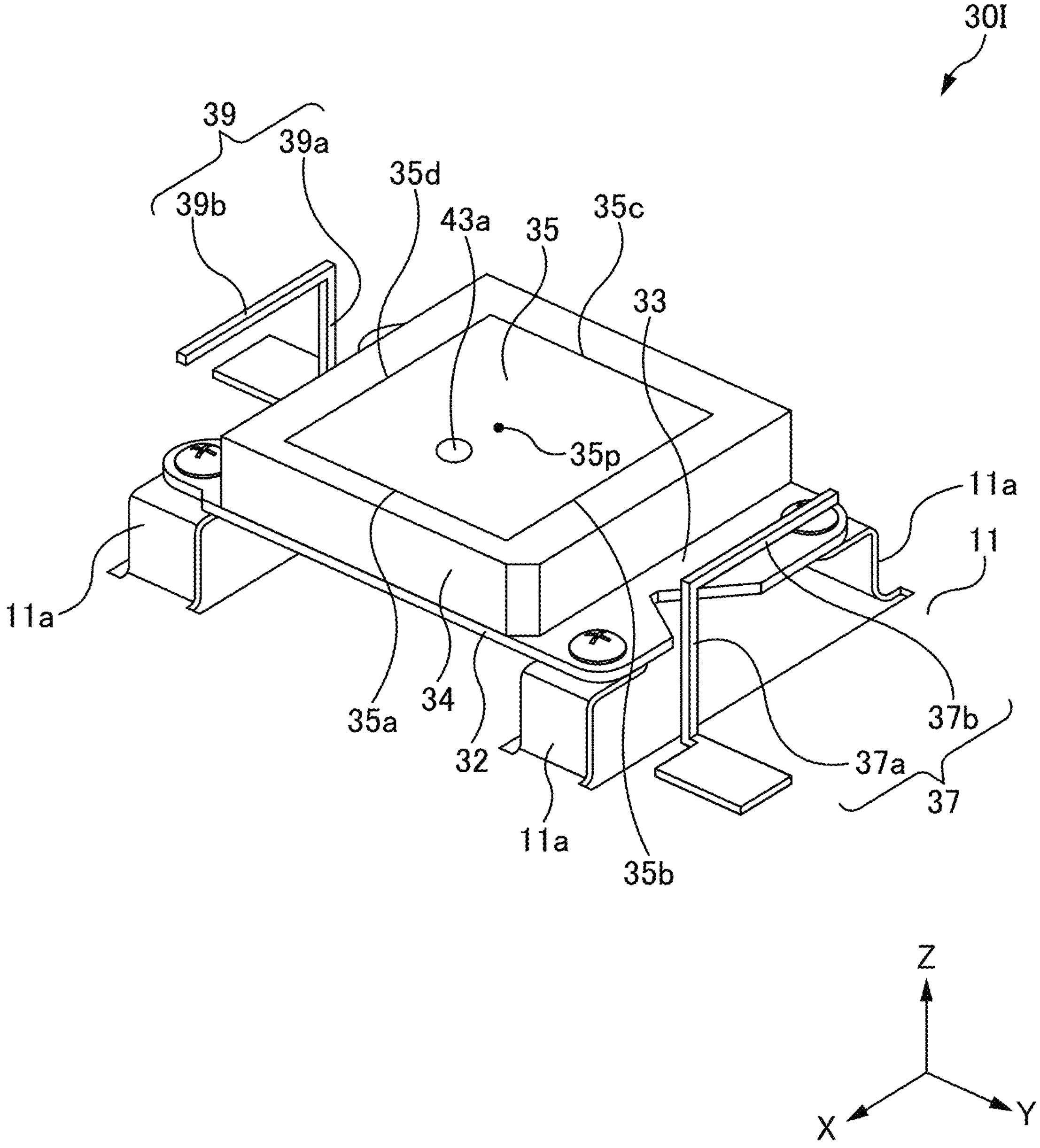
FIG. 29 is a perspective view of a patch antenna 30I.

FIG. 29 is a perspective view of a patch antenna 30I that receives linearly polarized waves. The patch antenna 30I illustrated in FIG. 29 is an antenna in which only the two parasitic elements 37, 38, are provided while the parasitic elements 36, 38 are removed from the patch antenna 30 illustrated in FIG. 3. In a case where the patch antenna 30H as illustrated in FIG. 29 receives linearly polarized waves, the parasitic elements 37, 39 intersect the cross-polarization plane.

Note that the patch antenna X is similar to the patch antennas 30H, 30I except that the parasitic elements 36 to 39 are not provided. With respect to the calculation, various conditions and the like are the same as the reference conditions in Table 1 except for the feed system and the polarized waves.

Figure 30:
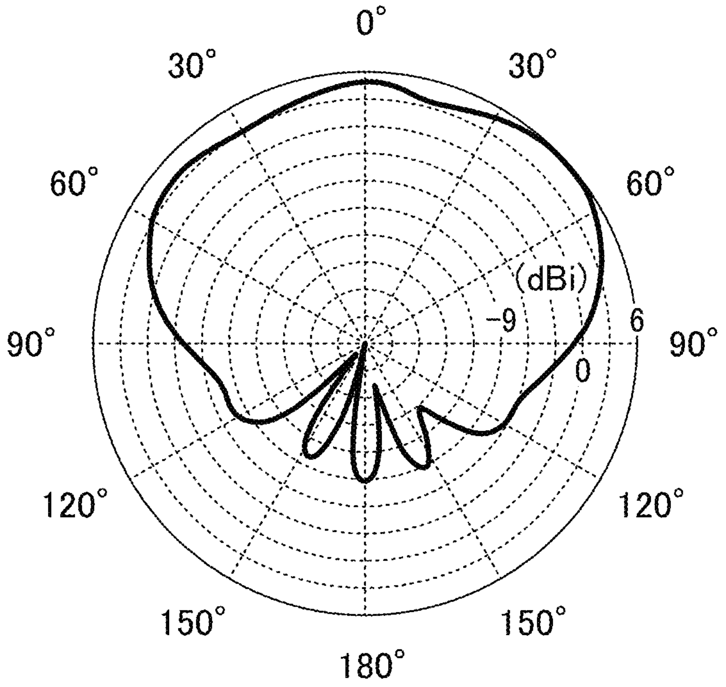
FIG. 30 is a chart of a radiation pattern in a main polarization plane of a patch antenna X.
Figure 31:
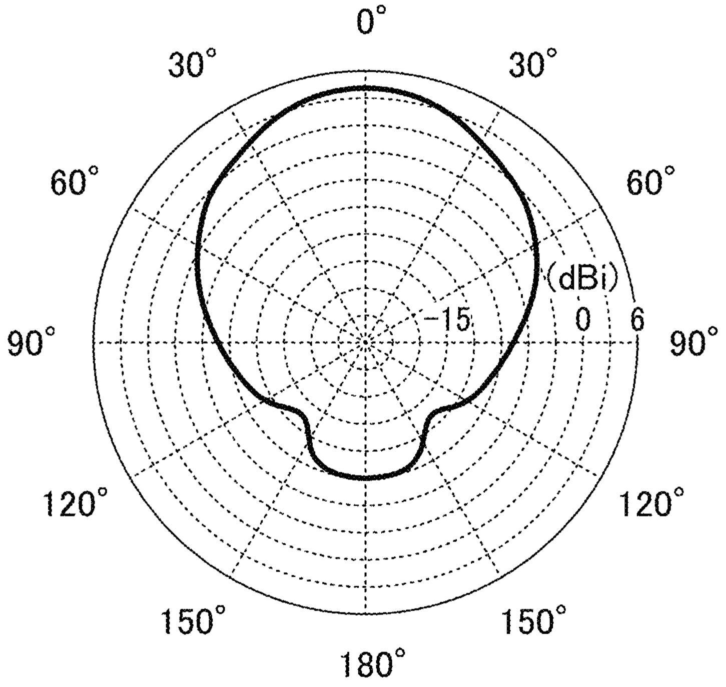
FIG. 31 is a chart of radiation pattern in a cross-polarization plane of a patch antenna X.
Figure 32:
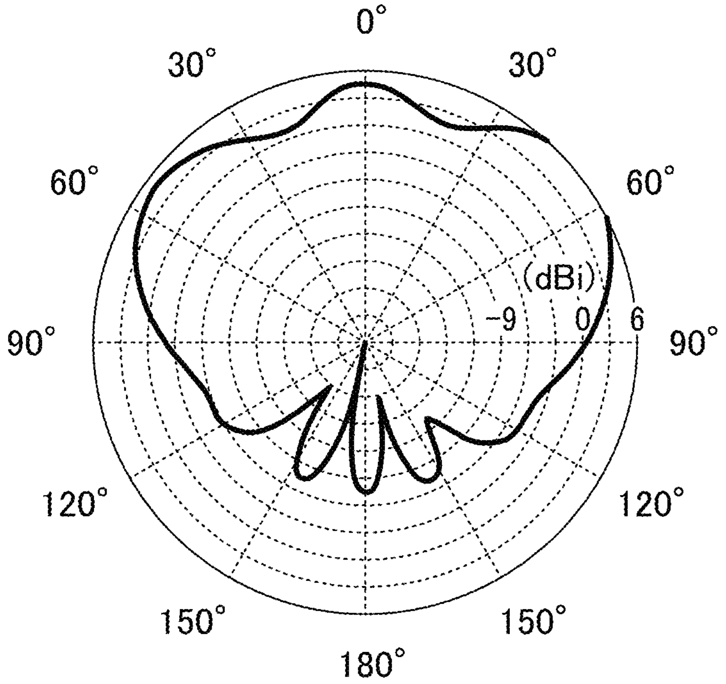
FIG. 32 is a chart of a radiation pattern in a main polarization plane of a patch antenna 30H.
Figure 33:
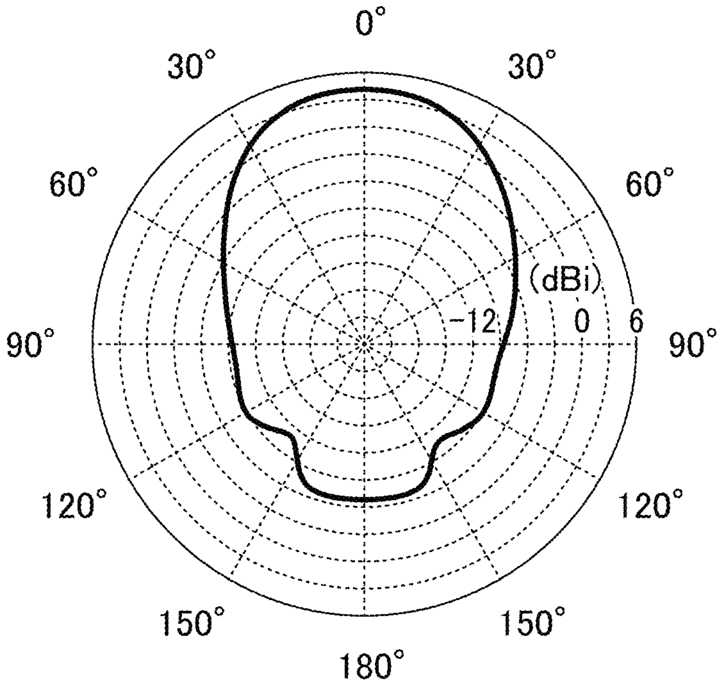
FIG. 33 is a chart of a radiation pattern in a cross-polarization plane of a patch antenna 30H.
Figure 34:
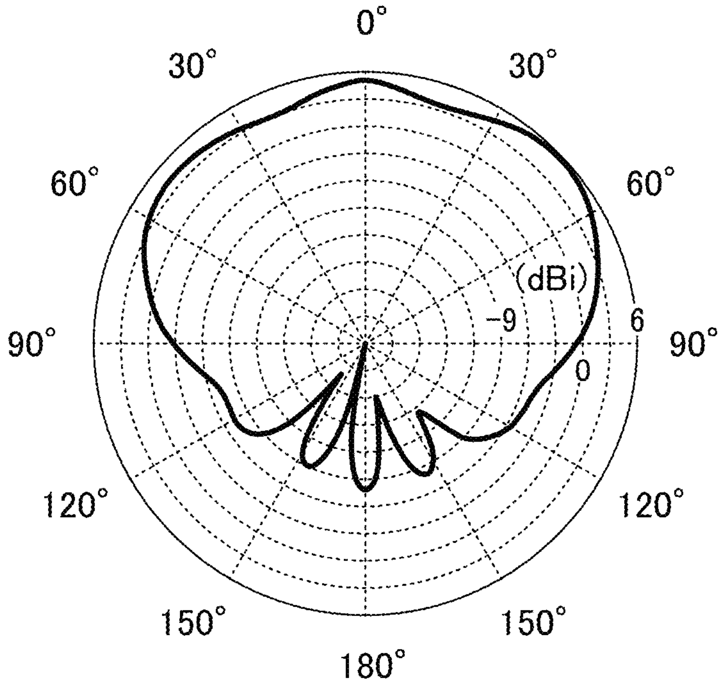
FIG. 34 is a chart of a radiation pattern in a main polarization plane of a patch antenna 30I.
Figure 35:
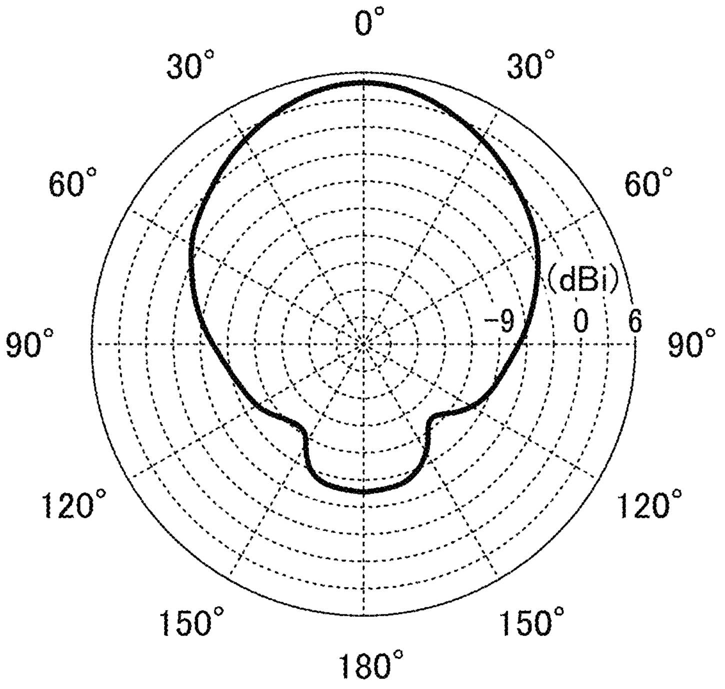
FIG. 35 is a chart of a radiation pattern in a cross-polarization plane of a patch antenna 30I.

FIGS. 30 and 31 illustrate calculation results of the patch antenna X, and FIGS. 32 and 33 illustrate calculation results of the patch antenna 30H. Further, FIGS. 34 and 35 illustrate calculation results of the patch antenna 30I. Here, FIGS. 30, 32, and 34 are each a chart of a radiation pattern of long-distance realized gain in a main polarized plane of linearly polarized waves, in a polar coordinate system. In FIGS. 30, 32, and 31, it is assumed that the positive Z-axis direction is 0°, and the positive X-axis direction and the negative X-axis direction are 90°. Further, FIGS. 31, 33, and are each a chart of a radiation pattern of long-distance realized gain in a cross polarized plane of linearly polarized waves, in a polar coordinate system.

As is apparent from a comparison between FIG. 30 and FIG. 32, the radiation pattern of the patch antenna 30H, in other words, the shape surrounded by the curved line, is wider in the direction of 90° than the radiation pattern of the patch antenna X. Further, as is apparent from a comparison between FIG. 31 and FIG. 33, the radiation pattern of the patch antenna 30H is narrower in the direction of 90° than the radiation pattern of the patch antenna X. Accordingly, the patch antenna 30H provided with the parasitic elements 36, 38 has lower gain at low elevation angles in the cross-polarization plane but higher gain at lower elevation angles in the main polarization plane, as compared with the patch antenna X.

Meanwhile, as is apparent from a comparison between FIGS. and 31 and FIGS. 34 and 35, the patch antenna 30I has almost the same radiation characteristics as those of the patch antenna X. Thus, even if the parasitic elements 37, 39 are provided, the effect of improvement in gain at low elevation angles was not observed.

Accordingly, in order to improve gain at low elevation angles in the main polarization surface of linearly polarized waves, it is preferable that the parasitic elements 36, 38 are disposed at positions facing each other with the radiating element 35 being interposed therebetween along the main polarization plane.

==Number of Parasitic Elements==

Although the patch antenna 30 is provided with four parasitic elements 36 to 39 in the surrounding region of the main body part of the patch antenna 30, the number of parasitic elements is not limited to this. For example, a plurality of parasitic elements may be provided for each of the sides of the radiating element 35 of the patch antenna 30.

==Inclination of the Pillar Portions==

In the patch antenna 30, the pillar portions 36*a* to 39*a* are perpendicular to the radiating element 35, but the present disclosure is not limited to this. The pillar portions 36*a* to 39*a* may be inclined with respect to, for example, a line perpendicular to the radiation surface of the radiating element 35, in other words, the Z-axis. Even in a case where the pillar portions 36*a* to 39*a* are provided at an angle to the base 11, the distance from the base end to the top portion of each of the pillar portions 36*a* to 39*a* may be the "height H."

==Inclination of Extension Portions==

In the parasitic element 36, the pillar portion 36*a* and the extension portion 36*b* bending from the pillar portion 36*a* form a right angle, but the present disclosure is not limited to this. For example, the pillar portion 36*a* and extension portion 36*b* may form an acute or obtuse angle. Further, each of the parasitic elements 36 to 39 may be formed by curving a bar-shaped conductive member. Thus, "bending" is satisfied as long as it is curving.

==Shape of Radiating Element==

The radiating element 35 is "substantially quadrilateral" in the patch antenna 30, but the present disclosure is not limited to this. For example, the radiating element 35 may be a circle, an oval, or a polygon other than the substantially quadrilateral shape. For example, in a case where the radiating element 35 is circular, the extension portions 36*b* to 39*b* may each be arc-shaped along the outer edge of the radiating element 35. Even when such a radiating element and parasitic elements as above are used, gain at low elevation angles can be improved.

==Number of Extension Portions Extending along Rotation Direction==

In the patch antenna 30 described above, four extension portions extend in the direction of rotation of circularly polarized waves, and, in the patch antenna 30D, two extension portions extend in the direction of rotation of circularly polarized waves. However, the present disclosure is not limited to these.

Figure 36:
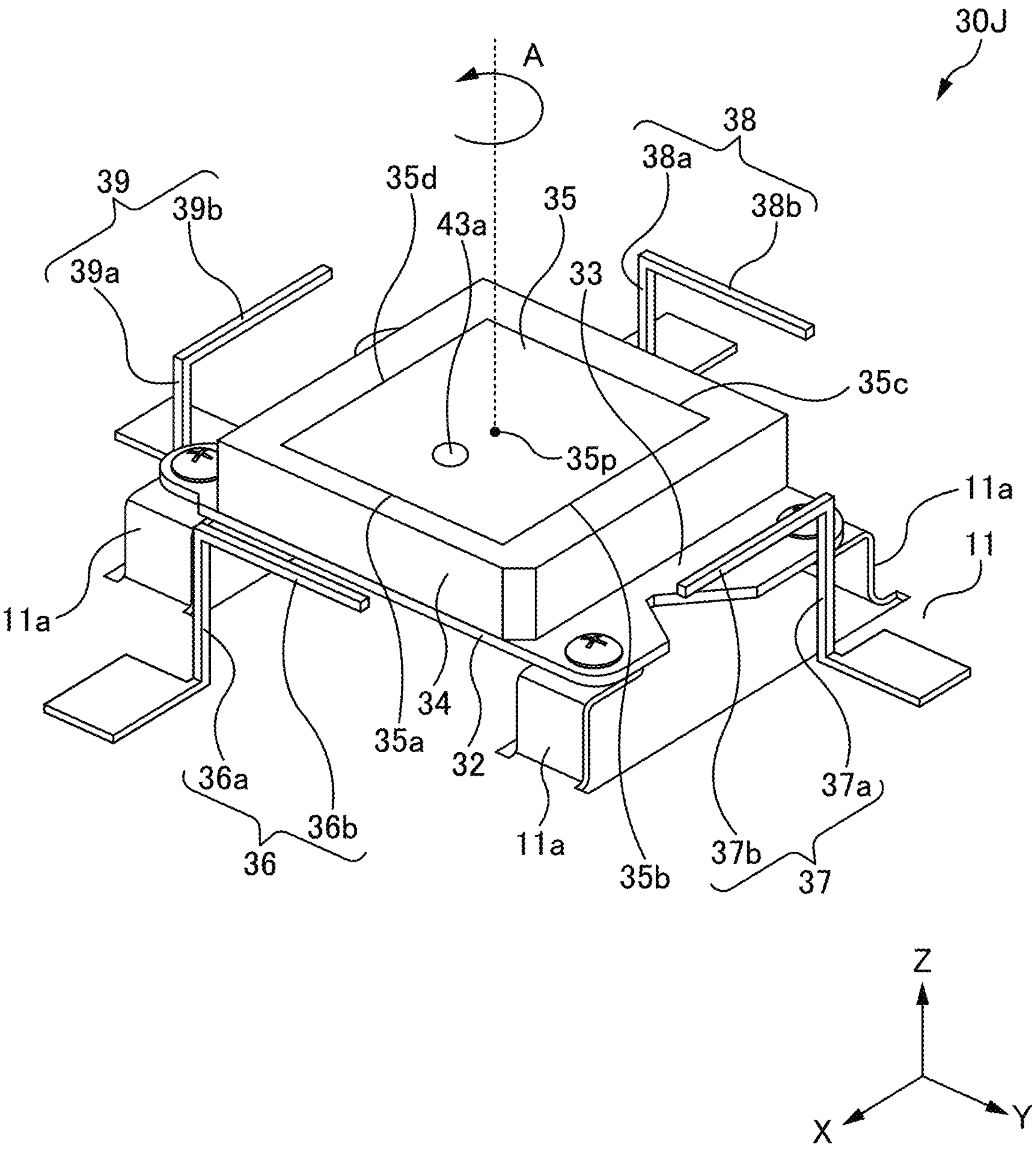
FIG. 36 is a perspective view of a patch antenna 30J.

FIG. 36 is a diagram illustrating a patch antenna 30J in which one extension portion is along the direction of rotation of circularly polarized waves. In the patch antenna 30J, the extension portion 36*b* is along the direction of rotation (extends in the direction of rotation), but the extension portions 37*b* to 39*b* extend in directions opposite to the direction of rotation.

Figure 37:
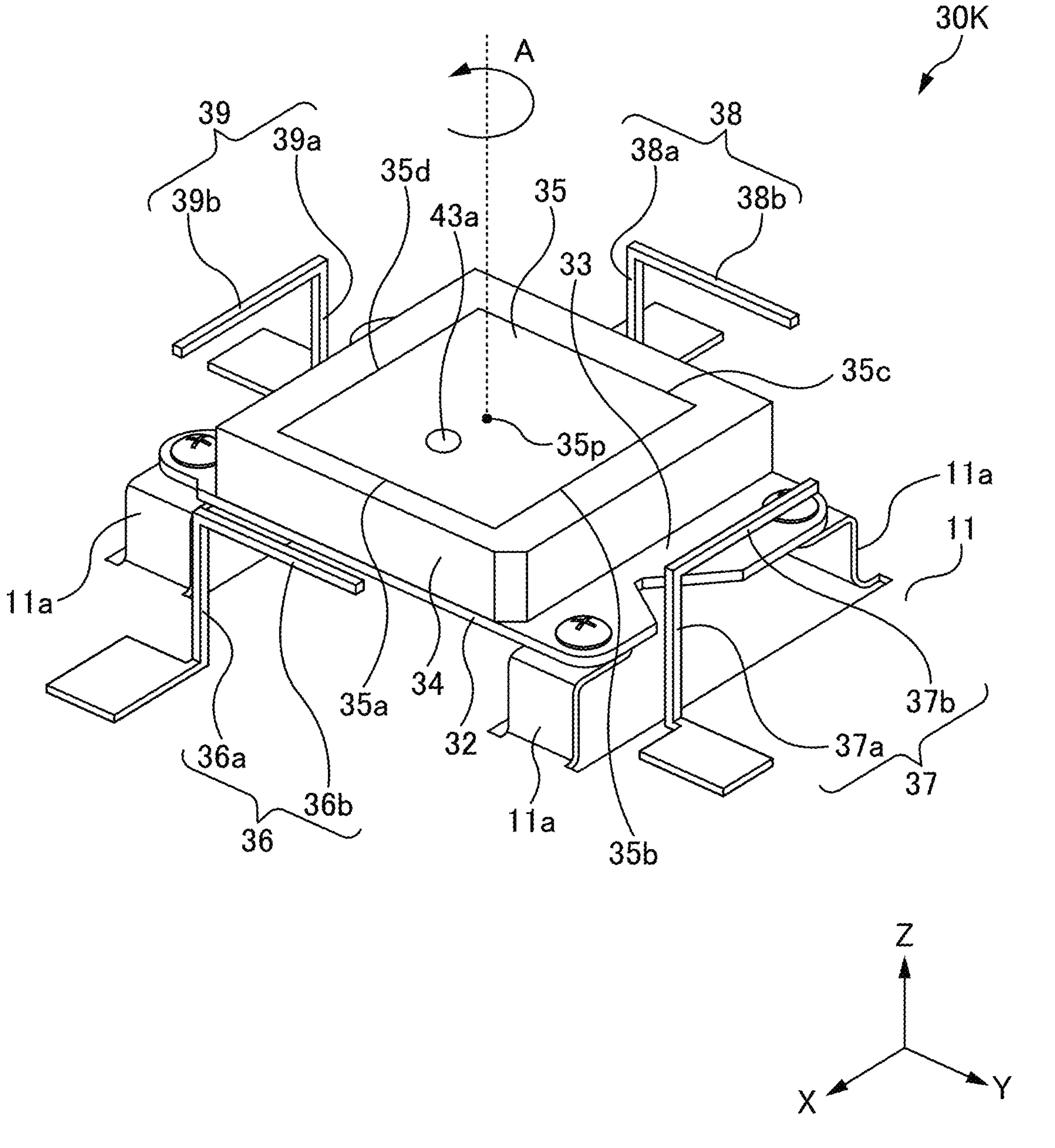
FIG. 37 is a perspective view of a patch antenna 30K.

FIG. 37 is a diagram illustrating a patch antenna 30K in which three extension portions are in the direction of rotation of circularly polarized waves. In the patch antenna 30K, the extension portions 36*b*, 37*b*, 39*b* are in the direction of rotation (extend in the direction of rotation), but the extension portion 38*b* extends in a direction opposite to the direction of rotation. The characteristics of a patch antenna can be adjusted by changing the number of extension portions that are in the direction of rotation of circularly polarized waves.

==Plate-Shaped Parasitic Elements==

Figure 38:
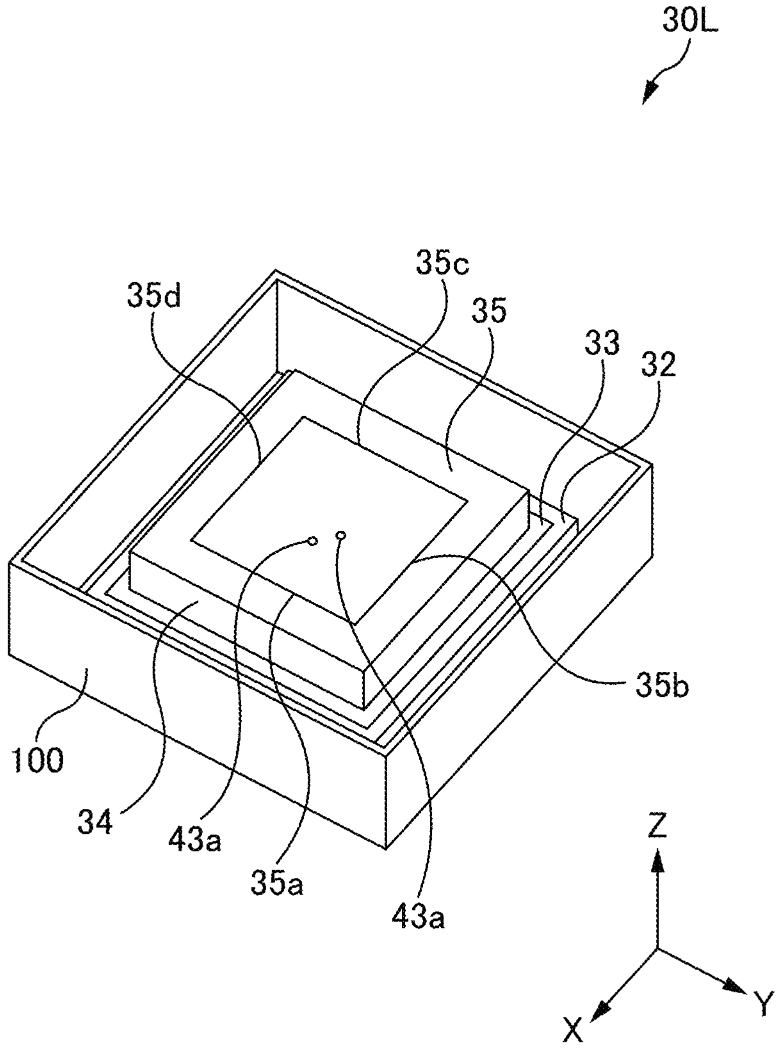
FIG. 38 is a perspective view of a patch antenna 30L.

The parasitic elements 36 to 39 are bent bars in the patch antenna 30, however, for example, four separate plate-shaped metal members may be bent and provided as the parasitic elements 36 to 39. Further, for example, as in a patch antenna 30L illustrated in FIG. 38, a grounded frame-shaped parasitic element 100 may be provided within a quarter of frequency used such that the radiating element 35 is surrounded therewith. The provision of such a frame-shaped parasitic element 100 in the surrounding region of the radiating element 35 can improve gain at low elevation angles in the patch antenna 30L.

Although the patch antenna 30 according to an embodiment of the present disclosure is provided at the in-vehicle antenna device 10, the present disclosure is not limited to this. For example, the patch antenna 30 may be provided in a typical shark fin antenna casing. Further, the patch antenna 30 may be provided in an antenna device to be mounted to an instrument panel. In such a case, the patch antenna 30 may be provided directly to a metal plate that corresponds to the base 11, or the like.

SUMMARY

The patch antenna 30 according to an embodiment of the present disclosure has been described above. For example, in the patch antenna 30, 30L, the parasitic elements 36 to 39, 100 are/is provided in the surrounding region of the radiating element 35, in other words, outside the outer edge of the radiating element 35. Thus, with the use of the patch antenna 30, 30L as such, gain at low elevation angles can be improved. Further, even with a small grounding area, such a configuration as above can improve gain at low elevation angles and also does not hinder size reduction of the antenna device and the patch antenna.

Further, the frame-shaped parasitic element 100 may be provided as in the patch antenna 30L, meanwhile, in the patch antenna 30, the plurality of parasitic elements 36 to 39 are each provided at a position away outward from the outer edge of the radiating element 35 by the distance D. With the plurality of parasitic elements 36 to 39 being provided as such, gain at low elevation angles can be improved.

Further, in the patch antenna 30, the distance D with respect to the parasitic elements 36 to 39 is equal to or smaller than a quarter of a wavelength used (a wavelength in a desired frequency band). With the parasitic elements 36 to 39 being provided at such positions, gain at low elevation angles can be improved with reliability.

Further, the total length of the parasitic element 36 according to an embodiment of the present disclosure is equal to or smaller than a quarter of a frequency used (a wavelength in a desired frequency band). With the total length of the grounded parasitic element 36 being set to such a length, the parasitic element 36 operates as a director. Accordingly, the patch antenna 30 can improve gain at low elevation angles.

Further, the patch antenna 30 can improve gain at low elevation angles, not only when receiving circularly polarized waves, but also when receiving linearly polarized waves. For example, in the patch antenna 30H, the parasitic elements 36, 38 are disposed along the main polarization plane of the radiating element 35, at positions facing each other with the radiating element 35 being interposed therebetween. With the parasitic elements 36, 38 being disposed at such positions, gain at low elevation angles can be improved.

Further, as described above, even if the radiating element 35 receives circularly polarized waves, the patch antenna 30 can improve gain at low elevation angles.

Further, in the parasitic element 36, the extension portion 36*b* extends from the top portion of the pillar portion 36*a* while being bent with respect to the pillar portion 36*a*. This makes it possible for the parasitic element 36 to have a desired total length without being too high. Accordingly, the use of the parasitic element 36 as such can reduce the size of the patch antenna 30.

Further, for example, in the patch antenna 30, the extension portions 36*b* to 39*b* extend in the direction of rotation of circularly polarized waves, thereby being able to improve gain over the entire elevation angles from low to high elevation angles.

Further, the radiating element 35 is "substantially quadrilateral," and, for example, the extension portion 36*b* is provided parallel to a side of the radiating element 35 closest thereto. Note that the term "parallel" includes being substantially parallel, and the parasitic element 36 only has to be provided with respect to the radiating element 35 so that the effect of the parasitic element 36 can be achieved.

Further, the height H (distance) from the base 11 to the parasitic element 36 is either substantially the same as or lower (shorter) than the height (distance) from the base 11 to the radiating element 35. Accordingly, the patch antenna 30 using the parasitic element 36 can be reduced in size.

Further, in the patch antenna 30, the parasitic element 36 and the like are disposed so as not to overlap with the radiating element 35 in plan view when the radiation surface of the radiating element 35 is seen in the Z-axis direction. This can prevent radio waves of the radiating element 35 from being adversely affected.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

The term "in-vehicle" in an embodiment of the present disclosure means being mountable to a vehicle, and thus it is not limited to one attached to a vehicle, but also includes one carried into a vehicle and used inside the vehicle. Further, although it is assumed that the antenna device in an embodiment of the present disclosure is used for a "vehicle" which is a wheeled vehicle, the present disclosure is not limited to this, and may be used for, for example, an air vehicle such as a drone and the like, a space probe, wheelless construction machinery, agricultural machinery, a mobile object such as a vessel and the like.

REFERENCE SIGNS LIST

1 vehicle
2 roof panel
3 roof lining
4 cavity
10 in-vehicle antenna device
11 base
11*a* seat portion
12 case
21 to 26 antenna
30, 30A to 30L patch antenna
31, 33 pattern
31*a* circuit pattern
31*b* ground pattern
32 circuit board
34 dielectric member
35 radiating element
35*a* to 35*d* side
35*p* center point
36 to 39, 100 parasitic element
36*a* to 39*a* pillar portion
36*b* to 39*b* extension portion
41 through-hole
42 feed line
43*a* feed point
45 coaxial cable
45*a* signal line
45*b* braid

The invention claimed is:

1. A patch antenna comprising:

a base;

a dielectric member;

a radiating element provided at the dielectric member; and at least one parasitic element provided in a surrounding region of the dielectric member and the radiating element, the at least one parasitic element being grounded at the base wherein the parasitic element comprises:

a pillar portion provided at the base, and an extension portion extending from a top portion of the pillar portion, the extension portion bending from the pillar portion, and wherein a distance between a grounded end portion of the pillar portion and the top portion of the pillar portion is shorter than a distance between the base and a position of the radiating element.

2. The patch antenna according to claim 1, wherein the at least one parasitic element comprises a plurality of parasitic elements, the plurality of parasitic elements are provided in the surrounding region of the radiating element, and the plurality of parasitic elements are each provided at a position away from an outer edge of the radiating element by a predetermined distance.

3. The patch antenna according to claim 2, wherein the predetermined distance is equal to or smaller than a quarter of a wavelength in a desired frequency band.

4. The patch antenna according to claim 2, wherein the parasitic element is a bent conductor whose length from a grounded end portion to a tip end is equal to or smaller than a quarter of a wavelength in a desired frequency band.

5. The patch antenna according to claim 2, wherein the radiating element is an element to receive linearly polarized electromagnetic waves, and the plurality of parasitic elements are provided at positions facing each other with the radiating element being interposed therebetween in a direction of a straight line connecting a feed point in the radiating element and a center point in a shape of the radiating element.

6. The patch antenna according to claim 1, wherein the radiating element is an element to receive circularly polarized electromagnetic waves.

7. The patch antenna according to claim 1 wherein the extension portion extends, from the top portion of the pillar portion, in a direction of rotation of circularly polarized waves.

8. The patch antenna according to claim 1, wherein the radiating element has a substantially quadrilateral shape, and the extension portion is provided parallel to a side of the radiating element.

9. The patch antenna according to claim 8, wherein a length of the extension portion is shorter than a length of the side.

10. The patch antenna according to claim 1, wherein the parasitic element is disposed so as not to overlap with the radiating element in plan view when seen in a direction orthogonal to a radiation surface of the radiating element.

11. The patch antenna according to claim 1, further comprising:

a circuit board; and a shield cover being attached to a first surface of the circuit board; wherein the dielectric member is placed at a second surface of the circuit board, the second surface being an opposite surface of the first surface.

12. The patch antenna according to claim 1, further comprising:

a seat portion that is provided at the base and that supports the dielectric member.

13. The patch antenna according to claim 1, wherein the at least one parasitic element comprises four or less parasitic elements.

14. The patch antenna according to claim 1, wherein the radiating element has a substantially quadrilateral shape, the at least one parasitic element comprises four parasitic elements, each of the four parasitic elements arranged on a respective side of the radiating element, and the extension portions of the four parasitic elements are disconnected from each other.

* * * * *